United States Patent
Fu et al.

(10) Patent No.: US 10,339,685 B2
(45) Date of Patent: Jul. 2, 2019

(54) SYSTEM FOR BEAUTY, COSMETIC, AND FASHION ANALYSIS

(71) Applicant: Northeastern University, Boston, MA (US)

(72) Inventors: Yun Fu, Wellesley, MA (US); Shuyang Wang, Malden, MA (US)

(73) Assignee: Northeastern University, Boston, MA (US)

( * ) Notice: Subject to any disclaimer, the term of this patent is extended or adjusted under 35 U.S.C. 154(b) by 245 days.

(21) Appl. No.: 15/120,287

(22) PCT Filed: Feb. 23, 2015

(86) PCT No.: PCT/US2015/017155
§ 371 (c)(1),
(2) Date: Aug. 19, 2016

(87) PCT Pub. No.: WO2015/127394
PCT Pub. Date: Aug. 27, 2015

(65) Prior Publication Data
US 2017/0076474 A1 Mar. 16, 2017

Related U.S. Application Data

(60) Provisional application No. 61/943,439, filed on Feb. 23, 2014, provisional application No. 61/994,169, filed on May 16, 2014.

(51) Int. Cl.
| | |
|---|---|
| *G06T 11/00* | (2006.01) |
| *G06T 11/60* | (2006.01) |
| *G06K 9/00* | (2006.01) |
| *G06T 3/00* | (2006.01) |
| *G06K 9/66* | (2006.01) |

(52) U.S. Cl.
CPC .......... *G06T 11/60* (2013.01); *G06K 9/00268* (2013.01); *G06K 9/00671* (2013.01); *G06T 3/0093* (2013.01); *G06T 11/00* (2013.01); *G06K 9/66* (2013.01)

(58) Field of Classification Search
CPC ....... G06T 11/60; G06T 3/0093; G06T 11/00; G06K 9/00268; G06K 9/00671; G06K 9/66
USPC .......................................................... 382/100
See application file for complete search history.

(56) References Cited

U.S. PATENT DOCUMENTS

| | | |
|---|---|---|
| 5,548,683 A | 8/1996 | Engel et al. |
| 6,293,284 B1 | 9/2001 | Rigg |
| 6,502,583 B1 | 1/2003 | Utsugi |

(Continued)

FOREIGN PATENT DOCUMENTS

WO 2007/128117 A1 11/2007

OTHER PUBLICATIONS

Chen, Cunjian, Antitza Dantcheva, and Arun Ross. "Automatic facial makeup detection with application in face recognition." Biometrics (ICB), 2 (Year: 2013).*

(Continued)

*Primary Examiner* — Amandeep Saini
(74) *Attorney, Agent, or Firm* — Arent Fox LLP

(57) ABSTRACT

A system and method are provided to detect, analyze and digitally remove makeup from an image of a face. An autoencoder-based framework is provided to extract attractiveness-aware features to perform an assessment of facial beauty.

23 Claims, 18 Drawing Sheets

(56) References Cited

U.S. PATENT DOCUMENTS

| | | | |
|---|---|---|---|
| 7,333,963 | B2 | 2/2008 | Widrow et al. |
| 7,409,372 | B2 | 8/2008 | Staelin et al. |
| 7,634,103 | B2* | 12/2009 | Rubinstenn .......... A45D 44/005 382/100 |
| 8,180,112 | B2 | 5/2012 | Kurtz et al. |
| 8,494,227 | B2 | 7/2013 | Prokoski |
| 2004/0167794 | A1 | 8/2004 | Shostack et al. |
| 2008/0273745 | A1* | 11/2008 | Bazin .................. A45D 44/005 382/100 |
| 2011/0234581 | A1* | 9/2011 | Eikelis ............... G06K 9/00228 345/419 |
| 2013/0169827 | A1* | 7/2013 | Santos ............... H04N 5/23229 348/207.1 |
| 2014/0019447 | A1 | 1/2014 | Goryavskiy et al. |

OTHER PUBLICATIONS

Zhou, Mingyuan. Nonparametric bayesian dictionary learning and count and mixture modeling. Diss. 2013. (Year: 2013).*

Tu, Peter, et al. Face reconstruction using flesh deformation modes. Elsevier Academic Press, 2005. (Year: 2005).*

C. Chen, et al., "Automatic Facial Makeup Detection with Application in Face Recognition", 6th IAPR International Conference on Biometrics (ICB), (Madrid, Spain), Jun. 2013, 8 pgs.

M. Zhou, "Nonparametric Bayesian Dictionary Learning and Count and Mixture Modeling", Department of Electrical and Computer Engineering Duke University, (2013), 100 pgs.

P. Tu, et al., "Face Reconstructions using Flesh Deformation Modes", Department of Electrical and Computer Engineering Duke University, Apr. 14, 2011, 16 pgs.

L. Liu, et al., "Wow! You Are So Beautiful Today!", ACM Trans. Multimedia Compt. Commun. Appl., Sep. 2014, vol. 11, No. 1s, 22 pgs.

A. Dantcheva, et al., "Can Facial Cosmetics Affect the Matching Accuracy of Face Recognition Systems?", Biometrics: Theory, Applications and Systems (BTAS), 2012 IEEE Fifth International Conference, 2012, pp. 391-398.

G. Guo, et al., "Face Authentication With Makeup Changes", IEEE Transactions on Circuits and Systems for Video Technology, May 2014, vol. 24, No. 5, pp. 814-825.

C. Florea, et al., "Eye Color Classification for Makeup Improvement", Proceedings of the Federated Conference on Computer Science and Information Systems, (2012), pp. 55-62.

G. Liu, et al., "Robust Recovery of Subspace Structures by Low-Rank Representation", IEEE Transactions on Pattern Analysis and Machine Intelligence, Jan. 2013, vol. 35, No. 1, pp. 171-184.

D. Sutic, et al., "Automatic Evaluation of Facial Attractiveness", MIPRO 2010, May 24-28, 2010, Opatija, Croatia, pp. 1339-1342.

J. Whitehill, et al., "Personalized Facial Attractiveness Prediction", IEEE International Conference on Automatic Face and Gesture Recognition, (2008), 7 pgs.

H. Yan, "Cost-sensitive ordinal regression for fully automatic facial beauty assessment", Neurocomputing, (2014), vol. 129, pp. 334-342.

L. Li, et al., "Learning low-rank and discriminative dictionary for image classification", Image and Vision Computing, (2014), vol. 32, pp. 814-823.

L. Ma, et al., "Sparse Representation for Face Recognition based on Discriminative Low-Rank Dictionary Learning", Conference on Computer Vision and Pattern Recognition (CVPR), IEEE, (2012), 8 pgs.

J. Wang, et al., "Locality-constrained Linear Coding for Image Classification", Computer Vision and Pattern Recognition (CVPR), IEEE, (2010), pp. 3362-3367.

S. Wang, et al., "Semi-Coupled Dictionary Learning with Applications to Image Super-Resolution and Photo-Sketch Synthesis", Computer Vision and Pattern Recognition (CVPR), IEEE, (2012), pp. 2216-2223.

G. Ye, et al., "Robust Late Fusion With Rank Minimization", Computer Vision and Pattern Recognition (CVPR), IEEE, Jun. 2012, pp. 3021-3028.

M. S. Almohammad, et al., "Face and Gait Fusion Methods: A Survey", International Journal of Computer Science and Telecommunications, Apr. 2013, vol. 4, Issue 4, pp. 19-28.

A. Kagian, et al., "A Humanlike Predictor of Facial Attractiveness", Advances in Neural Information Processing Systems, (2007), vol. 19, 8 pgs.

W-C Chiang, et al., "The cluster assessment of facial attractiveness using fuzzy neural network classifier based on 3D Moire features", Pattern Recognition, (2014), vol. 47, pp. 1249-1260.

K. Scherbaum, et al., "Computer-Suggested Facial Makeup", Eurographics, (2011), vol. 30, No. 2, pp. 485-492.

D. Guo, et al., "Digital Face Makeup by Example", Computer Vision and Pattern Recognition 2009, IEEE, (2009), pp. 73-79.

L. Liang, et al., "Facial Skin Beautification Using Adaptive Region-Aware Masks", IEEE Transactions on Cybernetics, Dec. 2014, vol. 44, No. 12, pp. 2600-2612.

G. Liu, et al., "Robust Subspace Segmentation by Low-Rank Representation", Proceedings of the 27th International Conference on Machine Learning (ICML-10), Haifa, Israel, (2010), 8 pgs.

Z. Liu, et al. "Expressive Expression Mapping with Ratio Images", Proceedings of the 28th annual conference on Computer graphics and interactive techniques, ACM, (2001), pp. 271-276.

P. Perez, et al., "Poisson Image Editing", ACM Transactions on Graphics (TOG), (2003), vol. 22, pp. 313-318.

M. Yang, et al., "Fisher Discrimination Dictionary Learning for Sparse Representation", IEEE International Conference on Computer Vision, (2011), pp. 543-550.

D. Gray, et al., "Predicing Facial Beauty without Landmarks", Proceeding ECCV'10 Proceedings of the 11th European conference on Computer vision: Part VI, Heraklion, Crete, Greece, Sep. 5-11, 2010, pp. 434-447.

L. Xu, et al., "An Automatic Framework for Example-Based Virtual Makeup", 20th IEEE International Conference on Image Processing (ICIP), Sep. 15-18, 2013, pp. 3206-3210.

K. Yu, et al., "High Dimensional Nonlinear Learning using Local Coordinate Coding", arXiv:0906.5190V1, [stat.ML], Jun. 29, 2009, 19 pgs.

E. J. Candes, et al., "Robust Principal Component Analysis?", Journal of the ACM, May 2011, vol. 58, No. 3, Article 11, 37 pgs.

P. N. Belhumeur, et al., "Eignefaces vs. Fisherfaces: Recognition Using Class Specific Linear Projection", IEEE Transactions on Pattern Analysis and Machine Intelligence, Jul. 1997, vol. 19, No. 7, pp. 711-720.

J. Maatta, et al., "Face spoofing detection from single images using texture and local shape analysis", IET Biometrics, Mar. 2012, vol. 1, Issue 1, pp. 3-10.

* cited by examiner

SYSTEM FOR BEAUTY, COSMETIC, AND FASHION ANALYSIS

CROSS-REFERENCE TO RELATED APPLICATIONS

This application claims the benefit under 35 U.S.C. § 119(e) of U.S. Provisional Patent Application No. 61/943,439, filed Feb. 23, 2014, entitled Methods and Systems for Digital Face Makeup Categorization, Decomposition, Removal, Evaluation and Analysis, and U.S. Provisional Patent Application No. 61/994,169, filed May 16, 2014, entitled Method and System for Automatic Beauty Recognition and Fashion Recommendation, the disclosures of which are incorporated by reference herein in their entirety.

STATEMENT REGARDING FEDERALLY SPONSORED RESEARCH OR DEVELOPMENT

This invention was made with government support under the ONR Young Investigator Award N00014-14-1-0484, U.S. Army Research Office Young Investigator Award W911NF-14-1-0218, and Air Force Office of Scientific Research Award FA9550-12-1-0201. The government has certain rights in the invention.

BACKGROUND

Facial makeup has a long history. There are many techniques, categories and products related to makeup or cosmetics. Cosmetics are used to hide facial flaws and appear more attractive. With these advancements, the use of makeup is socially fashionable in every aspect of our lives. On the other hand, the use of makeup poses a significant challenge to biometric systems. The face recognition problem has attracted a tremendous amount of research over the past decade [39] and has been significantly improved. However, there are still several factors that challenge the performance of face recognition system at this stage, which include age [30], spoof [36] and facial makeup. Facial makeup is capable of altering and hiding one's original appearance, which makes some recognition or verification tasks more difficult. In a most recent paper, Dantcheva et al. [2] discussed the negative impact introduced by facial cosmetics to the face recognition problem.

Research on makeup recommendation systems has also increased recently. In the ACM Multimedia 2013 best paper [1], Liu, et al. developed a system for hairstyle and facial makeup recommendation and synthesis. Their work is based on a facial beauty evaluation algorithm. They applied candidate makeup onto an original face and recommended to users the candidate makeup that resulted in a highest beauty score. This system produces appealing results but still has a lot of limitation, such as it can only deal with a face without makeup.

Compared with work on makeup recommendations, research dealing with an already made up face image is even rarer. Dantcheva, et al. [2] is the first work that explicitly established the impact of facial makeup on a face recognition system. They assembled two datasets, YouTube MakeUp (YMU) database and Virtual MakeUp (VMU) database, then tested the recognition performance before and after makeup with three face recognition methods: Gabor wavelets, Local Binary Pattern and the commercial Verilook Face Tookit.

Based on this work, there are two papers that focus on a face with makeup. In [3], the presence of makeup in face images is detected based on a feature vector that contains shape, texture and color information. The other paper [4] deals with the verification problem. They extract features from both a face with makeup and a face without makeup, then do the face matching based on correlation mapping.

Facial beauty and its measurement have been widely debated for centuries. In the psychology community, many research efforts have attempted to find some biologically based standards common to humans from different cultures, genders and ages. Some good candidates for these kinds of standards include the idea of golden ratio [17], facial thirds or facial trisection Pi, averageness [12], and symmetry [15]. More recently, research in this area has shifted to computer science, because of the need for more complex feature representations. More detailed research survey in human science is provided by Rhodes [21].

It is still in the early stages for using machines to predict attractiveness, and only a few works have been published, most of which by now are "geodesic ratio" based methods. Ever since the preliminary feature-based facial beauty scoring system proposed by Aarabi, et al. [11], various geometrical features are extracted to determine attractiveness based on facial symmetry, golden ratios, or neoclassical canons. Although these methods produce promising results, they all suffer from: (1) heavy duty use of landmarks annotation, and (2) non-unified criteria for attractiveness. Therefore, a fully automatic paradigm learned by machine has not been achieved.

The first attempt to do appearance-based attractiveness prediction is from Whitehill, et al. [24]. They used eigenface and Gabor filter analysis on more than 2000 photographs using ε-SVM (support vector machine). Sutic et al. [22] used eigenfaces with different classification methods such as KNN (k-nearest neighbors) and AdaBoost (adaptive boosting). Gray et al. [16] built a multiscale model to extract features to feed into a classical linear regression model for predicting facial beauty. In the recent work of Haibin [25], a cost-sensitive ordinal regression is proposed to categorize face in beauty order.

Research into facial beauty has recently drawn attention in research with pattern recognition and computer vision techniques. However, research is mainly focused on face beauty estimation, while the research related to facial makeup is still quite limited.

In the machine learning field more generally, recent research has led to the rapid growth in the theory and application of dictionary learning [42] and low-rank representation [33]. The performance of problems such as image classification has improved with a well-adapted discriminative low-rank dictionary [35, 32]. In the cross-modal dictionary learning literature, Wang et al. [41] proposed semi-coupled dictionary learning to do image super-resolution. This work has not, however, been applied to the makeup detection problem or to perform makeup reversion or removal.

SUMMARY OF THE INVENTION

A system and method are provided for the analysis of facial make-up on a digital image of a human face wearing makeup and for removing the makeup from the facial image. The makeup detection problem is addressed by adding locality constraints on discriminative low-rank dictionary learning and a sequential dictionary learning is introduced to perform makeup reversion.

Provided with a digital image of a person's face wearing make-up, the system and method segment the image into regions or patches, image analysis is performed on each patch, the make-up is categorized and the make-up may be deconstructed, recreating the face without makeup. Segmentation breaks the image of the face into regions, for example, for the eyes, eyebrows, mouth/lips and skin (the balance of the face). Image analysis is performed on each patch based on color, shape, smoothness and reflectivity. Categorization of the make-up is based on established standards of makeup style. Deconstruction can involve a makeup sub-step database.

In one aspect, the present system is able to detect, analyze and digitally remove makeup from an image of a face. When a facial image is input to the system, the system can recognize whether or not cosmetics are present on the face and where on the face the cosmetics are located. After being located, the cosmetics can be analyzed, either separately or as a whole, to determine, for example, a category in which the cosmetic falls (such as daily makeup, theatrical makeup, and the like), the skill level with which the cosmetics have been applied, and whether the cosmetics are suitable for the person's age and characteristics. The system can decompose the makeup into steps of application and types and characteristics (such as color, texture, and the like) of cosmetic products. The system can be used for facial recognition applications by removing the makeup from a facial image.

In another aspect, a system is able to analyze a facial image and provide a determination of beauty or attractiveness. In one embodiment, a set of classifiers are used to process head-shots and classify the image on an attractiveness scale. To generate the classification, a set of predictive models are trained on images that have established attractiveness scores. Output from the predictive models is represented as a matrix, which is then fused to generate a prediction.

As a demonstration, a random pool of images was divided into four equal-sized subsets: a training set of attractive images, a testing set of attractive images, a training set of non-attractive images, and a testing set of non-attractive images. Attractive/non-attractive autoencoder pairs were constructed using five visual descriptors to extract the low-level features: raw pixel, Eigenface, LBP, SIFT, and Gabor filter. The autoencoders were trained using the respective training sets (e.g., an attractiveness autoencoder used the training set of attractive images). For each pair of autoencoders, two representative results are generated—a concatenation result (the pair) and a difference result (scores for attractive images minus scores for non-attractive images). The representations for each pair are processed with a ridge regression and the resulting value is placed in a matrix. The low-rank late fusion of the matrix produces a fused score. The two testing sets were then used to evaluate the model, which showed the effectiveness of the proposed framework and significant improvements over previous approaches.

In another aspect, the present system provides an attractiveness-aware auto-encoder to search for better representations for facial attractiveness. The system includes the following features: (1) Provide a fully automatic framework with no landmark annotation requirement, which therefore could be extended to a "wild" dataset collected either from one or more social websites or from individuals, such as customers; (2) Integrate several low-level features for rich attractiveness-aware descriptors; (3) Introduce a low-rank representation late fusion framework to boost the performance of ranking scores from different features.

In one embodiment, a system for analyzing an image of a human face for the presence of makeup is provided, comprising one or more processors and memory, including a dataset comprising images of human faces, the images comprising facial images of multiple human subjects, and including multiple images associated with a single human subject showing steps of makeup application including a face with no makeup, a face with an intermediate stage of makeup application, and a face with a final makeup application. The one or more processors can be trained using the dataset to predict an image of a human face without makeup from an input image of a human face wearing makeup. Machine-readable instructions can be stored in the memory, that upon execution by the one or more processors cause the system to carry out operations comprising: receiving from an input device an input image of a human face wearing makeup; detecting the presence of the makeup on the input image; decomposing the input image to remove the makeup from the input image by applying a mapping from makeup features to non-makeup features; and providing to an output device an output image of the human face with the makeup removed from the image.

In a further embodiment, a method for analyzing an image of a human face for the presence of makeup is provided, comprising:

receiving an input image of a human face wearing makeup at a computer comprising one or more processors and memory, including a dataset comprising images of human faces, the images comprising facial images of multiple human subjects, and including multiple images associated with a single human subject showing steps of makeup application including a face with no makeup, a face with an intermediate stage of makeup application, and a face with a final makeup application, the one or more processors trained using the dataset to predict an image of a human face without makeup from an input image of a human face wearing makeup;

detecting the presence of the makeup on the input image by reference to the dataset;

decomposing the input image to remove the makeup from the input image by applying a mapping from makeup features to non-makeup features in the dataset; and providing to an output device an output image of the human face with the makeup removed from the image.

In other aspects, the system and method include categorizing the makeup on the input image into a category. The categories can include one or more of everyday makeup, regular makeup, fashion makeup, fashion photography makeup, fashion runway makeup, television makeup, film makeup, theatrical makeup, stage makeup, special effects makeup, airbrushed makeup, special events makeup, and high definition makeup.

In other aspects, the system and method include wherein the detecting step further comprises detecting the presence of the makeup on one or more facial regions, the facial regions comprising an eye region, an eyebrow region, a lip region, and a global skin region.

In other aspects, the system and method include wherein the detecting step further comprises detecting one or more perceptual effects of the makeup, the perceptual effects comprising skin color, eye shape, lip shape, skin texture, skin smoothness, and skin highlights.

In other aspects, the system and method include wherein detected perceptual effects are classified into makeup items by the one or more processors trained with the dataset of human faces.

In other aspects, the system and method include one or more processors trained with locality-constrained low-rank dictionary learning, a support vector machine classifier, or an adaptive boosting classifier.

In other aspects, the system and method include wherein the eye shape, the lip shape, and the skin texture are detected by one or more edge detection filters.

In other aspects, the system and method include wherein the skin texture is characterized by determining local binary patterns for various pixel cells on the image.

In other aspects, the system and method include wherein the skin smoothness is characterized by image intensity values at various pixels on the image.

In other aspects, the system and method include wherein the skin highlights are characterized by determining dichromatic reflections of the skin.

In other aspects, the system and method include wherein the dataset includes images separated by facial regions, the facial regions comprising one or more of an eye region, an eyebrow region, a lip region, and a global skin region.

In other aspects, the system and method include wherein one or more processors are trained by sequential dictionary learning using a set of sub-dictionaries learned from the dataset, and the step of decomposing the input image to remove the makeup comprises applying a projection matrix through at least a portion of the set of sub-dictionaries.

In other aspects, the system and method include decomposing the input image comprises finding a nearest neighbor image in the dataset and removing makeup under the guidance of the dataset.

In other aspects, the system and method include decomposing the input image comprises mapping makeup features on the input image to non-makeup features on the output image.

In other aspects, the system and method include wherein the one or more processors are trained with locality-constrained low-rank dictionary learning, a semi-coupled dictionary learning method, a Bayesian inference method, a subspace learning method, a sparse representation method, or a deep learning method.

In other aspects, the system and method include, prior to the step of detecting the presence of makeup on the input image, the steps of locating fiducial landmarks on the facial image, warping the facial image into a canonical form, and splitting the facial image into facial regions.

In other aspects, the system and method include, after the step of decomposing the input image, warping the facial image back and blending to replace a reconstructed part of the image on an original image.

In other aspects, the system and method include after the decomposing step, adding a textural detail comprising original wrinkles to the image.

In other aspects, the system and method include instructions to evaluate the input makeup image by determining suitability of a makeup style for one or more personal characteristics, for an event, or for an occasion.

In other aspects, the system and method include a dataset of information about cosmetic products and instructions to provide a selection of cosmetic products to emulate a makeup face.

In other aspects, the system and method include wherein the input device comprises a scanner, a camera, a computer, a mobile device, or a further processor.

In other aspects, the system and method include wherein the output device comprises a video display device, a computer monitor, a mobile device, a printer, a facial recognition system, or a security system.

In other aspects, the system and method include wherein the one or more processor and the memory are disposed on a computer, a server, or a mobile device.

In a further embodiment, a system is provided for an assessment of facial attractiveness, comprising one or more processors and memory, including a first auto-encoder trained with one or more visual descriptors of more attractive faces and a second auto-encoder trained with one or more visual descriptors of less attractive faces. Machine-readable instruction stored in the memory, that upon execution by the one or more processors cause the system to carry out operations comprising:

receiving from an input device an input image of a human face;

extracting low-level features from the input image of the human face, inputting the low-level features to the first autoencoder and to the second autoencoder;

determining a first output from the first autoencoder and a second output from the second autoencoder;

comparing a difference between the first output and the second output, the difference comprising a value representative of attractiveness of the human face; and outputting the value representative of attractiveness to an output device.

In another embodiment, a method for providing an assessment of facial attractiveness, comprising:

providing one or more processors and memory, including a first auto-encoder trained with one or more visual descriptors of more attractive faces and a second auto-encoder trained with one or more visual descriptors of less attractive faces;

receiving from an input device an input image of a human face;

extracting low-level features from the input image of the human face, inputting the low-level features to the first autoencoder and to the second autoencoder;

determining a first output from the first autoencoder and a second output from the second autoencoder;

comparing a difference between the first output and the second output, the difference comprising a value representative of attractiveness of the human face; and outputting the value representative of attractiveness to an output device.

In other aspects, the system and method include wherein the second output from the second autoencoder reproduces the input to the second encoder, and the first output from the first autoencoder diverges from the input to the first autoencoder toward a more attractive human face.

In other aspects, the system and method include wherein the low level features comprise raw pixels, an eigenface, a local binary pattern, a scale invariant feature transform, and a Gabor filter.

In other aspects, the system and method include wherein the first autoencoder and the second autoencoder comprises a first pair of autoencoders, and further comprising at least a second pair of autoencoders, the autoencoder of the second pair trained with one or more low level features of more attractive faces and with one or more low level features of less attractive faces.

In other aspects, the system and method include wherein in the step of extracting low-level features from the input image of the human face, the low-level features are extracted from patches of the human face.

DESCRIPTION OF THE DRAWINGS

The invention will be more fully understood from the following detailed description taken in conjunction with the accompanying drawings in which.

DETAILED DESCRIPTION OF THE INVENTION

The disclosures of U.S. Provisional Patent Application No. 61/943,439, filed Feb. 23, 2014, entitled Methods and Systems for Digital Face Makeup Categorization, Decomposition, Removal, Evaluation and Analysis, and U.S. Provisional Patent Application No. 61/994,169, filed May 16, 2014, entitled Method and System for Automatic Beauty Recognition and Fashion Recommendation, are incorporated by reference herein in their entirety.

Figure 1:
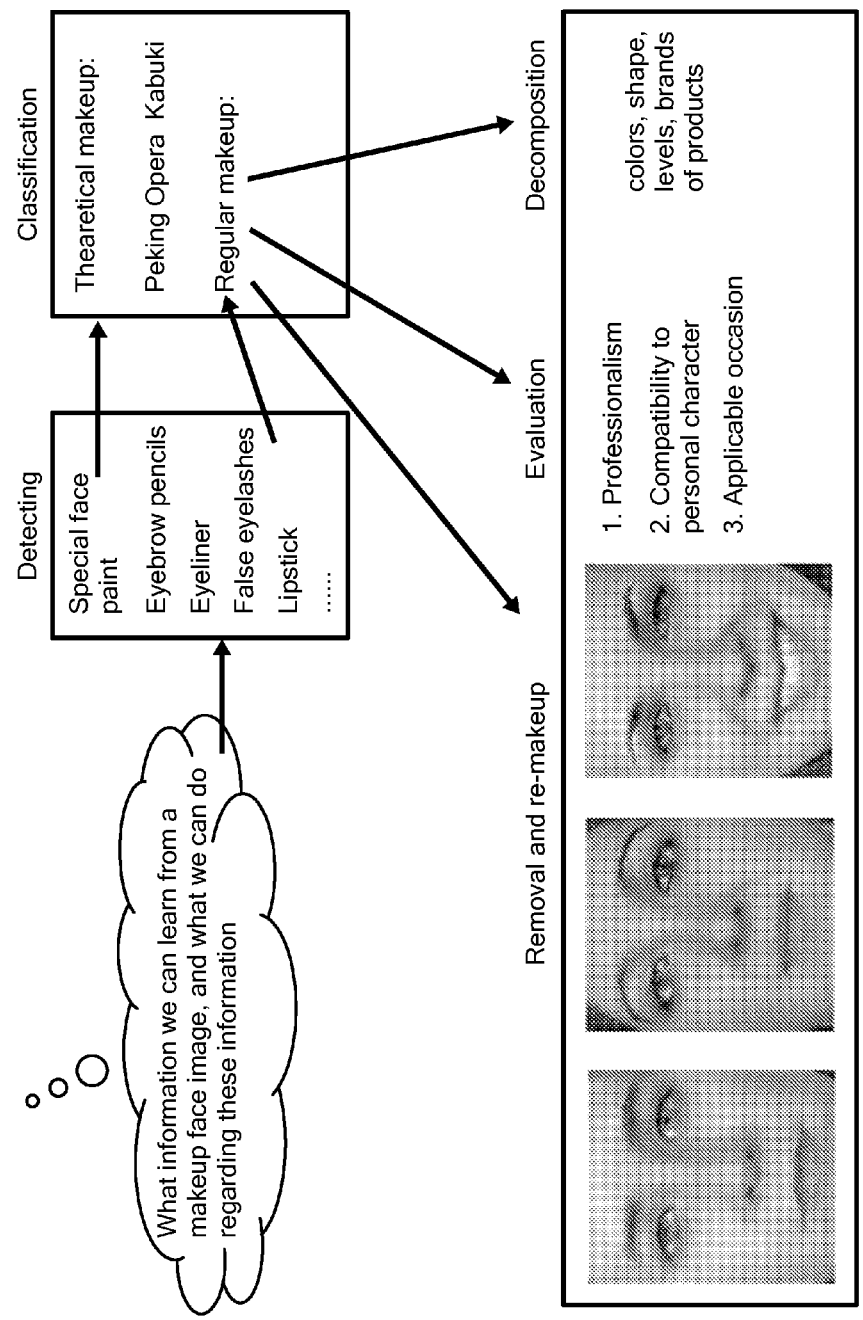
FIG. 1 is a schematic illustration of an overall framework of a facial makeup analysis system and method according to the present invention.

Referring to FIG. 1, a system and method are provided for facial makeup analysis. Based on the makeup information detected from input images, the system can classify the makeup into different categories, then take corresponding actions. For example, the system can detect facial makeup on an image of a subject human face, localize each makeup region, evaluate the professionalism of the makeup application, and decompose each region of cosmetics to recover the original face.

In one embodiment, the present system and method use a makeup detection scheme using locality-constrained low-rank dictionary learning (LC-LRD). The makeup removal or reversion is considered as a multi-step cross-modal problem; that is each makeup status is a modal and a non-makeup modal can be synthesized stepwise from makeup modal. To this end, a sequential dictionary learning (SDL) is provided based on semi-coupled dictionary learning (SCDL). Further details regarding SCDL can be found in [41]. The present system thus is able to 1) detect facial makeup and reverse it automatically, which is believed to be the first work seeking to recover an original face without makeup from a face with makeup; 2) deploy a new SDL algorithm based on SCDL to remove makeup, and apply a deep auto-encoder structure to calculate the between-steps projection for the initialization of SDL, 3) introduce a dictionary learning algorithm to detect facial makeup, and 4) build a stepwise makeup (SMU) dataset for the sake of makeup removal or reversion.

The system and method incorporate a plurality of makeup-related datasets of images of the human face. The images include facial images of multiple human subjects, and including multiple images associated with a single human subject showing steps of makeup application including a face with no makeup, a face with an intermediate stage of makeup application, and a face with a final makeup application.

The system and method can detect and locate makeup regions on face. Different types of makeup can be applied to different regions of the face. Most cosmetics are distinguished by the area of the body intended for application. Eye region makeup includes, for example, eyeliner, eyebrow pencils, eye shadow. Lip region makeup includes, for example, lipstick, lip gloss, lip liner, lip plumper, lip balm, lip conditioner, lip primer, and lip boosters. Global skin appearance makeup includes, for example, concealer, foundation, face powder, blusher, and highlight.

The present system and method can distinguish among various makeup techniques. Makeup artists use various techniques depending on the application. For example, makeup techniques can be sorted into the following categories, which are not intended to be exhaustive or mutually exclusive:

(1) Fashion makeup: Fashion makeup is used in magazine photography as well as on the fashion runways which are specially designed to promote a product, model or a special fashion design. Since the viewer for this type of occasion is not far from the model, who is typically exposed to many lights, a delicate and careful type of makeup is needed. Fashion makeup is also commonly used in television and film, ranging from a natural prime look to more sophisticated applications that take into account factors such as color balance.

(2) Theatrical makeup: Theatrical makeup or stage makeup is a special type of makeup for dancers or actors that are on stage. Stage makeup is used in conjunction with stage lighting to highlight the actors' faces in order make expressions visible to the audience from moderate distances. This often includes defining the eyes and lips as well as the highlights and lowlights of the facial bones.

(3) Special effects makeup (FX makeup): The use of special effects techniques enhances physical features to exhibit metaphysical characteristics and is used for fantasy makeup as well. The use of prosthetics and plaster casting are also required for projects that entail non-human appearances. Accents such as theatrical blood and ooze are also techniques applicable to this type of makeup.

(4) Airbrushing: An airbrush is a small, air-operated device that sprays various media including alcohol and water-based makeup by a process of nebulization. The earliest record of use of an airbrush for cosmetic application dates back to the 1925 film version of Ben-Hur. Airbrushing has recently been re-popularized by the advent of high definition television (HDTV) and digital photography, where the camera focuses on higher depths of detail. Liquid foundations that are high in coverage but thin in texture are applied with the airbrush for full coverage without a heavy build-up of product.

(5) Bridal makeup: Bridal makeup is a new segment in a makeup artist's repertoire. From ethnic, to glamorous, to contemporary, makeup artists are now an important part of wedding planning in Asia, Europe, and North America.

(6) High definition makeup: This is an art which involves the use of light reflectors and ingredients such as minerals to give the skin a flawless finish. This was developed due to the further development of high definition mediums and the cost implications of airbrush makeup.

In one embodiment, the system and method deal with two situations, regular or everyday makeup and theatrical makeup. Regular makeup is much lighter than makeup used for the stage or for photography. The pigments are natural looking, giving regular makeup a much more organic look. Regular makeup is intended more for the background and should blend in to one's natural features. Therefore there exists some regular patterns that can be used to describe, evaluate and edit the makeup. Theatrical makeup is used for the stage, theater, and for achieving special effects with makeup. This kind of makeup is used to create the appearance of the characters that are portrayed during a theater production, in film and television, and for photography. Almost every facial feature, including the apparent shape of an actor's face, can be changed using makeup. Therefore, it can be difficult to recover the original face beneath the makeup.

The system and method can analyze and make use of different types of information. For example, different types of makeup can be applied to different regions of the face. Most cosmetics are distinguished by the area of the body intended for application. Eye region makeup includes, for example, eyeliner, eyebrow pencils, and eye shadow. Lip region makeup includes, for example, lipstick, lip gloss, lip liner, lip plumper, lip balm, lip conditioner, lip primer, and lip boosters. Global skin appearance makeup includes, for example, concealer, foundation, face powder, blusher, and highlight. The system and method can identify these types of makeup, and can identify characteristics, such as colors and textures.

The system and method can differentiate between professional and less skilled applications of makeup. A professional makeup application makes effective use of color and light. For example, makeup colors in the eye region can be selected to improve or define the eyes while remaining in harmony with the overall look and style of the person. Colors can be selected to relate to one another. In addition to choosing makeup products that co-ordinate, the overall makeup should match the wearer's personal characteristics, such as face type and age. Furthermore, different occasions need different kind of makeup.

The present system and method are operable to detect facial makeup, categorize the makeup skills, decompose the steps of cosmetics application to recover the original face, and to evaluate the makeup. The system incorporates a plurality of makeup-related datasets of images of the human face. The images can be, for example, photographs or sketches obtainable from various social media sources, makeup video tutorials from YouTube, and images and comments from Google and WikiHow. From the datasets, different types of description features can be extracted for different problems.

Figure 2:
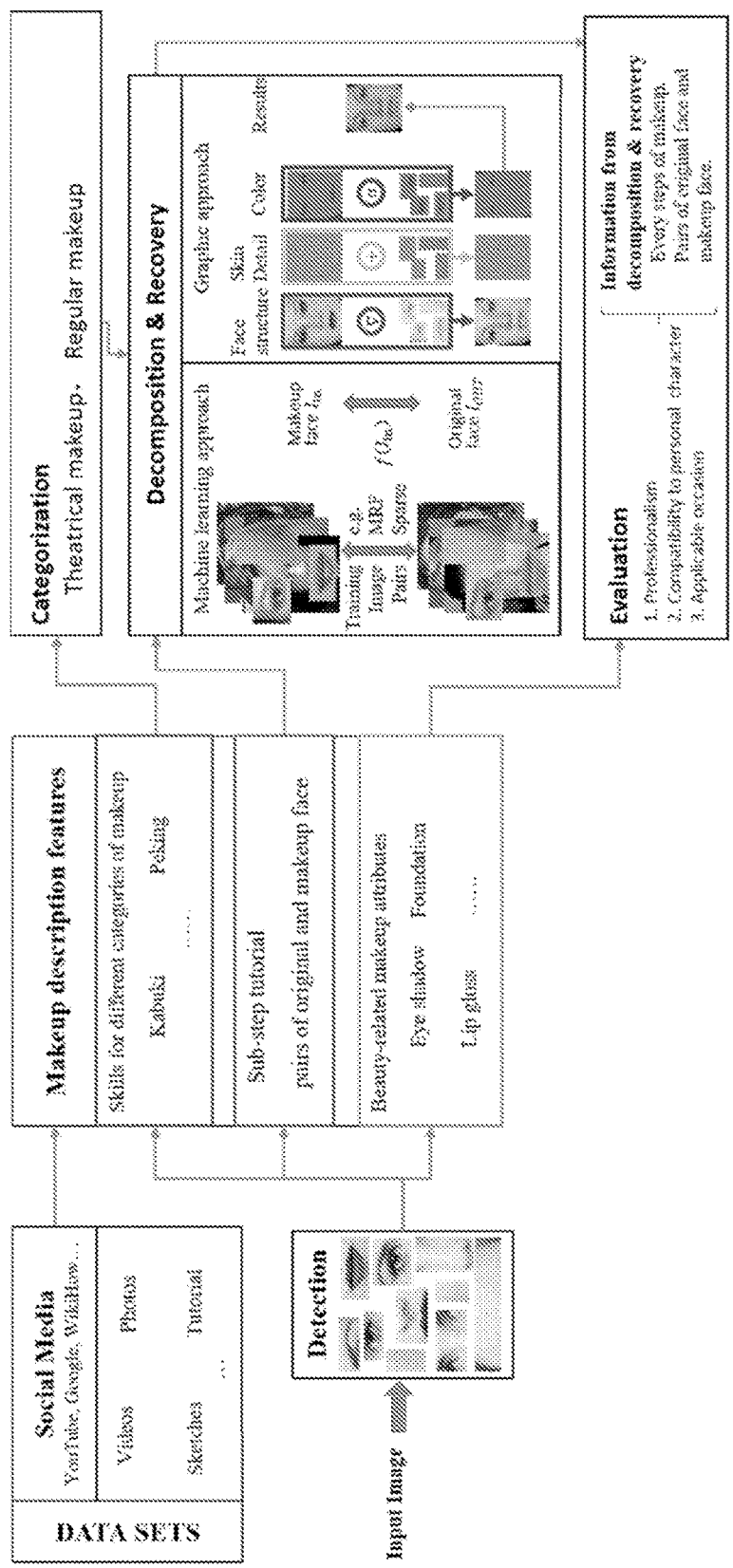
FIG. 2 is a schematic flowchart of a system and method for facial makeup analysis illustrating datasets to provide a large amount of data related to facial images with makeup, makeup detection from an input image, makeup description features, and use of the features to categorize the makeup, for makeup decomposition and recovery, and for makeup evaluation.

FIG. 2 further shows a techniques flowchart of the present system and method. The system and method provide approaches corresponding to following four problems: detection, categorization, decomposition and recovery, and evaluation.

1. Detection

The first step of the system is detecting and locating the makeup region in face. The system evaluates three facial regions: the eye region, the lip region, and the global skin region. The possible makeup items associated with each region are shown in Table 1.

TABLE 1

Possible makeup items

| Facial region | Possible makeup item |
| --- | --- |
| Eye region | Mascara, eyeliner, eyebrow pencils, eye shadow, false eyelashes, gels and powders |
| Lip region | Lipstick, lip gloss, lip liner, lip plumper, lip balm, lip conditioner, lip primer, and lip boosters |
| Global skin | Primer, concealer, foundation, face powder, rouge, blush or blusher, highlight |

Initially, the facial image is pre-processed to detect the presence of a human face and to align the face for further processing, described further below. (Correct?) After pre-processing, the face is separated into several patches or regions: the eye region, the lip region, and the global skin region. In some embodiments, an eyebrow region can be defined separately from the eye region. Then different features are provided to characterize facial cosmetics computationally based on how humans apply makeup. Makeup application steps generally include one or more of the following:

1) Old makeup is removed and the face is washed.
2) A concealer is applied.
3) A foundation coat is applied and optionally set with a setting powder.
4) A highlighter is applied.
5) Contouring is applied.
6) Blush is applied.
7) Eyebrows are filled in.
8) Eyeshadow is applied. Optionally, an eyeshadow primer is applied first.
9) Eyeliner is applied.
10) Mascara or false eyelashes are applied.
11) A lip balm, primer, or sealer is applied.

12) A lip liner is applied.

13) Lipstick or lip gloss is applied.

The perceptual effects induced by makeup are a consequence of changes in facial appearance, which include altered colors and shapes in the mouth and eye region, and refined skin texture and smoothness. Therefore the choice of features is based on the following four aspects:

(a) Skin Color: facial skin color may be changed after applying cosmetic products; therefore, color-based features, determined for example, by pixel values, can be used.

(b) Shape and Texture: filters for edge detection, such as a set of Gabor filters, can be used to extract shape and texture information across different spatial scales and filter orientations. To characterize the skin texture patterns, a local binary pattern (LBP) can also be determined for various pixel cells on the image.

(c) Smoothness: in characterizing the facial smoothness, the image intensity values of various pixels can be used within each patch.

(d) Highlight: light reflection from the skin surface, such as specular or diffuse, can be characterized. For example, a dichromatic reflection model such as described by Shafer [6] can be adopted to characterize the facial reflection, in order to compute the facial highlight.

Each of these four features is computed in each facial region independently.

Then a suitable machine learning algorithm is used to train one or more processors with makeup and non-makeup datasets to identify and located the makeup items in the image. For example, a locality-constrained low-rank dictionary learning algorithm, described further below, can be used. Other training algorithms can also be used. For example, a SVM (support vector machine) or Adaboost (adaptive boosting machine learning algorithm) classifier trained by makeup and non-makeup datasets can identify and locate the makeup items in each image.

2. Categorization

After obtaining the above local features of makeup, much information can be obtained by considering these features, either separately or as a whole.

First, the makeup is classified into different categories, such as regular makeup, theatrical makeup or special effects makeup. Depending on the category, different actions can be taken as applicable to the different kinds of makeup. As mentioned before, theatrical makeup and special effects makeup hide almost every feature of the original face, and they have a variety of purposes. Therefore, it can be difficult to tell if the makeup is, for example, suitable or esthetic, and it can be difficult or impossible to recover the original face. But, the system can determine information, such as the kind of theatrical production. For example, the system can identity makeup for use in Peking Opera or Sichuan Opera from China, Kabuki opera from Japan, or western opera.

All traditional operas have a systematic and unique makeup technique. Using Peking opera as an example, the makeup is used to reflect the identity, status, personality and appearance of the characters and therefore can intensify the artistic appeal on stage. As an impressionistic and exaggerated art, facial makeup in Peking Opera is featured by painting brows, eyelids and jowls in various patterns such as bat, swallow wing and butterfly wing. Additionally, there exist some invariable images including white-face Tsao Tsao and black-face Bao Zheng. Due to these unchangeable rules in different types of opera makeup, it is possible to extract some features based on these rules to train the system to classify different operas or even different characters.

3. Decomposition & Recovery

Figure 3:
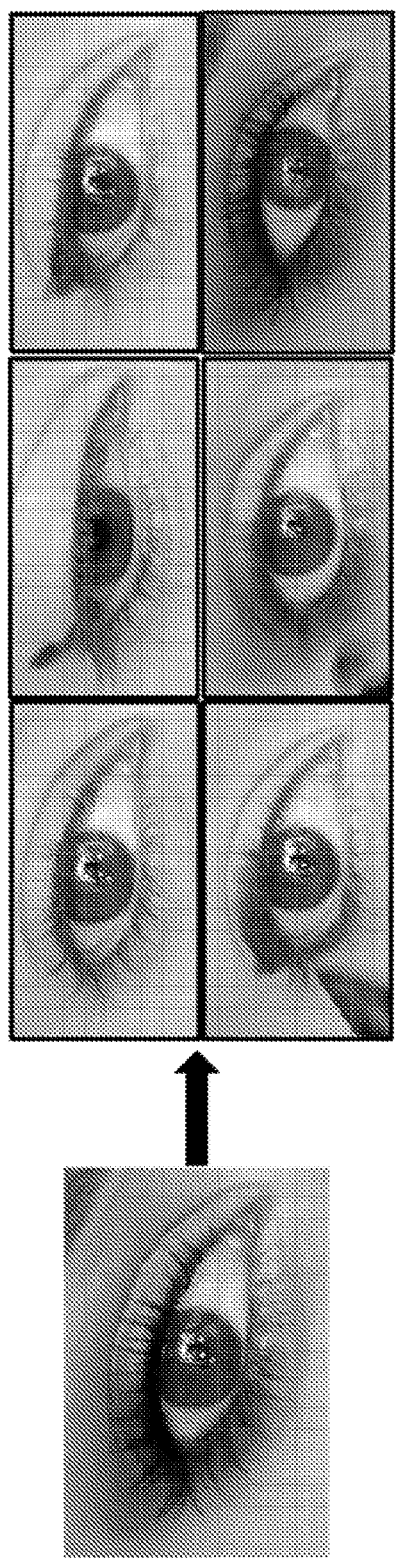
FIG. 3 is an example of makeup decomposition in an eye region.

Regular or everyday makeup is a common makeup situation. Regular makeup can be decomposed into several possible procedures, which can then be used to guide users in how to apply makeup to achieve a look similar to a face in an image, a target image. The information provided by the system may include: makeup colors, facial region, shape, levels, light or heavy application, and even the candidate brands of cosmetic products which can realize this makeup. FIG. 3 shows several steps decomposed from an eye region makeup.

The problem of replicating a makeup look in a target image is a more difficult problem that is not addressed in existing work that merely instructs how to apply cosmetics to an original face, because the original features of the target image have been covered with makeup products. To address this challenge, a 'Makeup Sub-step' dataset is built, which contains multiple images associated with a single human subject showing various stages of makeup application, including a face with no makeup, a face with one or more intermediate stages of makeup application, and a face with a final makeup application. The images can be obtained from any suitable source or sources, such as YouTube video makeup tutorials. The existing YouTube makeup database (YMU) is also useful, which contains many pairs of before and after makeup images. With this dataset, this problem can be solved by using both graphic approaches and machine learning approaches.

Figure 4:
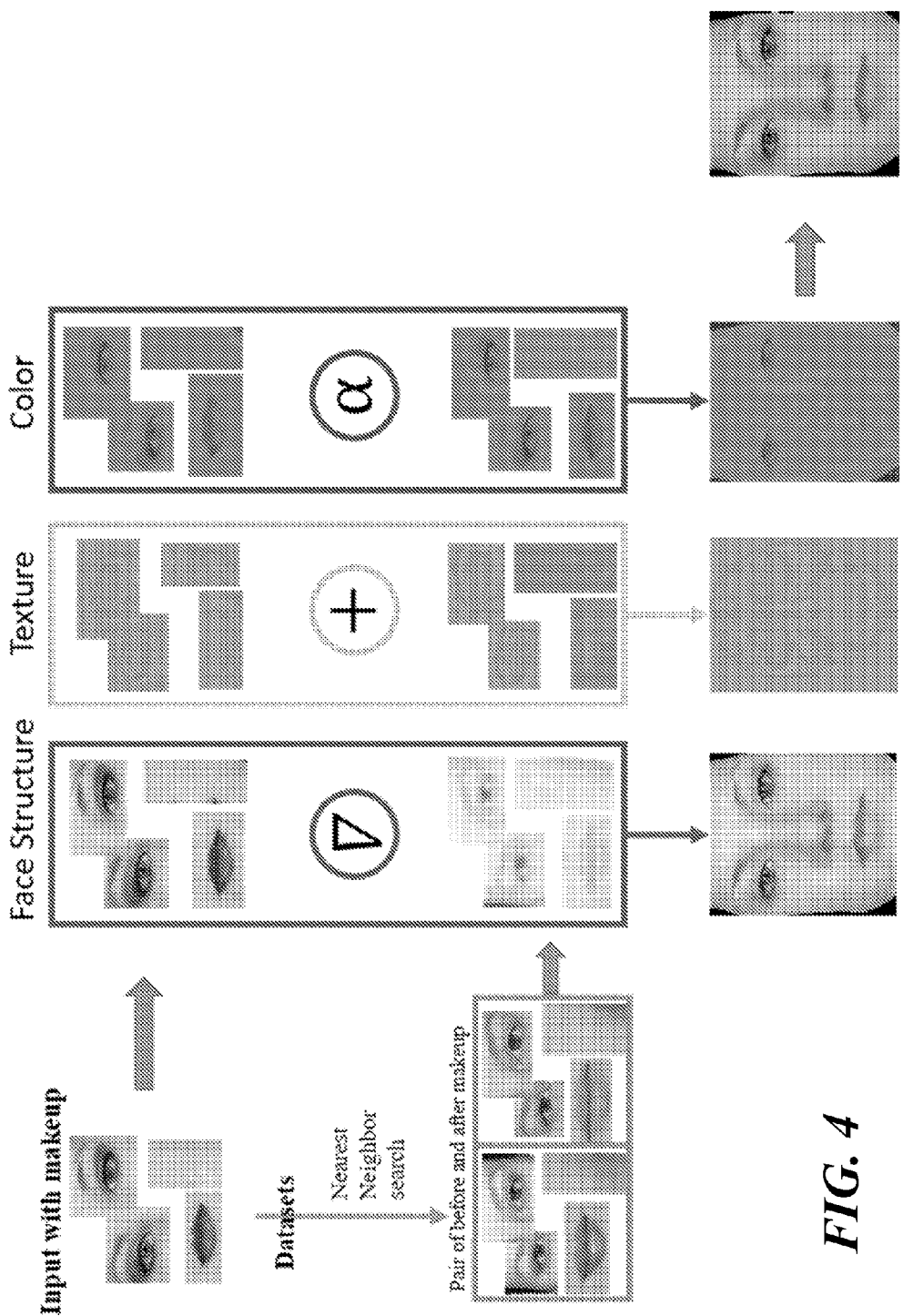
FIG. 4 is an example of makeup decomposition using a graphic approach.

For the graphic approaches, the face area of the target image is separated into several layers, for example, three layers, and the image's makeup is removed from each layer in steps or stages. Layers can be, for example, structure, such as a shape or shapes; details, such as texture; and color. Referring to FIG. 4, when a target image of a face with makeup is input into the system, first, the nearest neighbor makeup face is located in the dataset, using for example the k-nearest neighbor algorithm. Then, the makeup of the target image is decomposed step by step in ear layer under the guidance of the dataset. The makeup decomposition can be performed in each facial region or patch separately, or for the face as a whole. This method is in contrast to certain prior art methods dealing with example-based virtual makeup [8, 9], in which the objective is to add cosmetics to a non-makeup face under the guidance of makeup examples.

For the machine learning approaches, a mapping from makeup features to non-makeup features is learned from training images. This mapping may be explicit, such as a function mapping from input to output, or implicit, in which it is hidden in the model and relies on various approaches to construct the output model. Various learning method algorithms can be used, such as a Bayesian inference method, a subspace learning method, a sparse representation method, a low-rank representation method, and a deep learning method.

In addition to these two approaches, some features like correlation between eyebrow and hair colors can also help to recover the original face.

By decomposing the makeup either step by step or in just one step to non-makeup, the system and method can finally recover the original face. This capability can have wide applications. For example, a user can be instructed in how to apply makeup as in a desired target image to achieve a similar look. As another example, to improve an already made-up face, some unneeded cosmetics in the image of the face can be removed, and then other more attractive ones can be added. The system and method can be used for facial recognition in security systems. For some facial images with hard to remove makeup, the system and method can provide a group of candidate original faces, which can also be useful in facial recognition systems, for example, for security purposes.

4. Evaluation

The basic idea of regular makeup is to hide blemishes or flaws and highlight one's natural beauty. Based on these purposes, the system can first learn the professional makeup's principals, and then evaluate the input makeup image in the following way:

(1) To determine if the makeup employs a proper use of the color and light, including the local improvement by use of the makeup products and harmony with the overall look and style.

(2) To determine if the makeup style matches a person's personal characteristics, such as facial shape, eye color, hair style and age.

(3) To determine if a makeup application is appropriate for a particular occasion, such as a wedding, an audition, or a date.

The information obtained from the decomposition and recovery sections, such as each step of makeup, or pairs of an original face without makeup and the same face with makeup, can be used in the evaluation section.

There are many works about facial beauty evaluation. To the best of our knowledge, however, the only work related to makeup beauty evaluation is a 2013 study by Liu [1]. Through a Beauty e-Experts database annotated with different makeup types, a multiple tree-structured super-graphs model was learned to explore the complex relationships among these makeup attributes. Based on this work, the present system further considers personal characteristics and awareness of the occasion in the makeup evaluation. For example, Florea, et al. [10] proposed a method to classify the eye (iris) color according to the criteria used in cosmetics for the eye makeup. By using this method, the present system can evaluate whether the eye region makeup is suitable for the original eye.

Besides these feature-based criteria, the present system can also use a machine learning method to learn the relationship between makeup style and personal characteristics. The training set can be many groups of images, and each group can include an original face and its several kinds of makeup images. The makeup images can be computer generated. Then the match level of different makeup in terms of the original face in each group is annotated.

Figure 5:
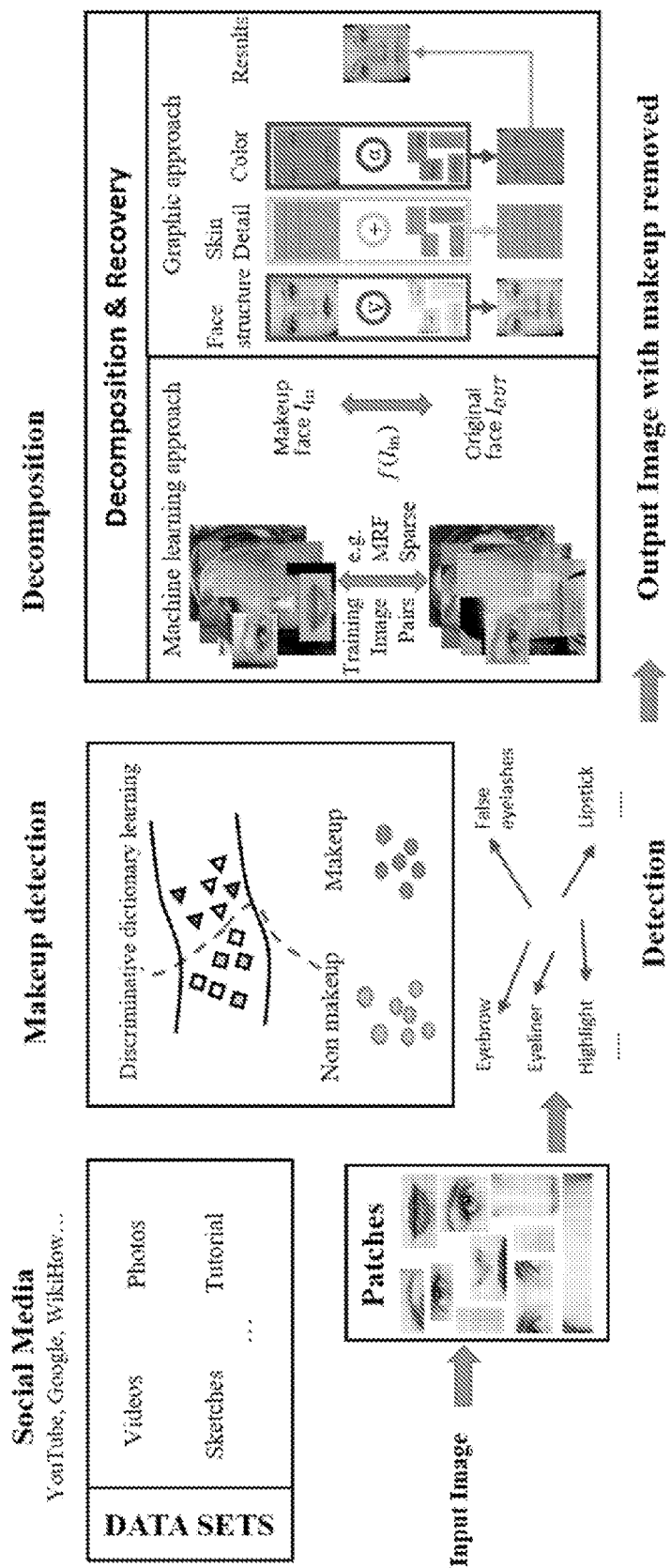
FIG. 5 is a further schematic illustration of a framework of a facial makeup analysis system and method.
Figure 6:
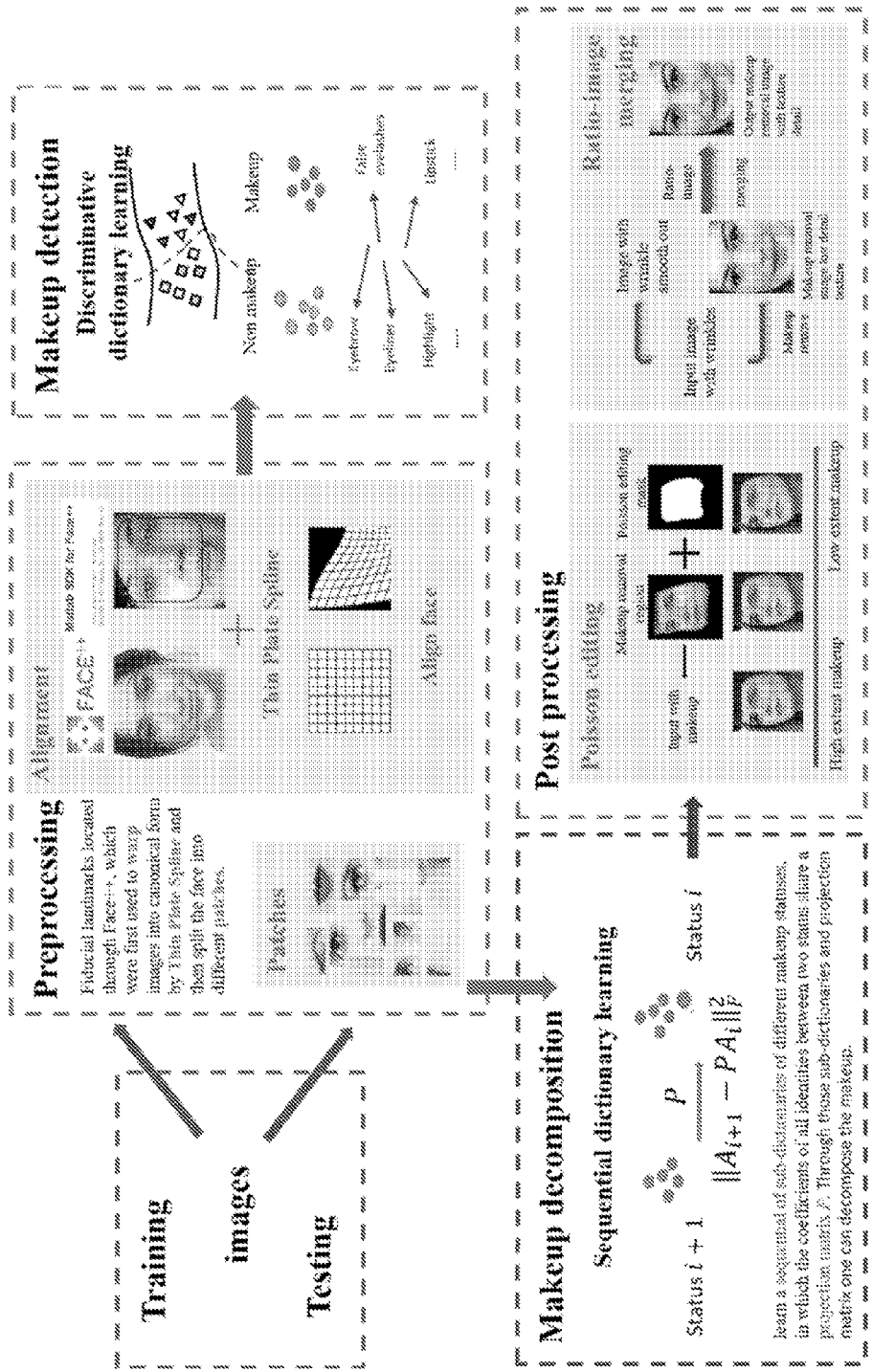
FIG. 6 is a still further schematic illustration of a framework of a facial makeup analysis system and method.
Figure 7:
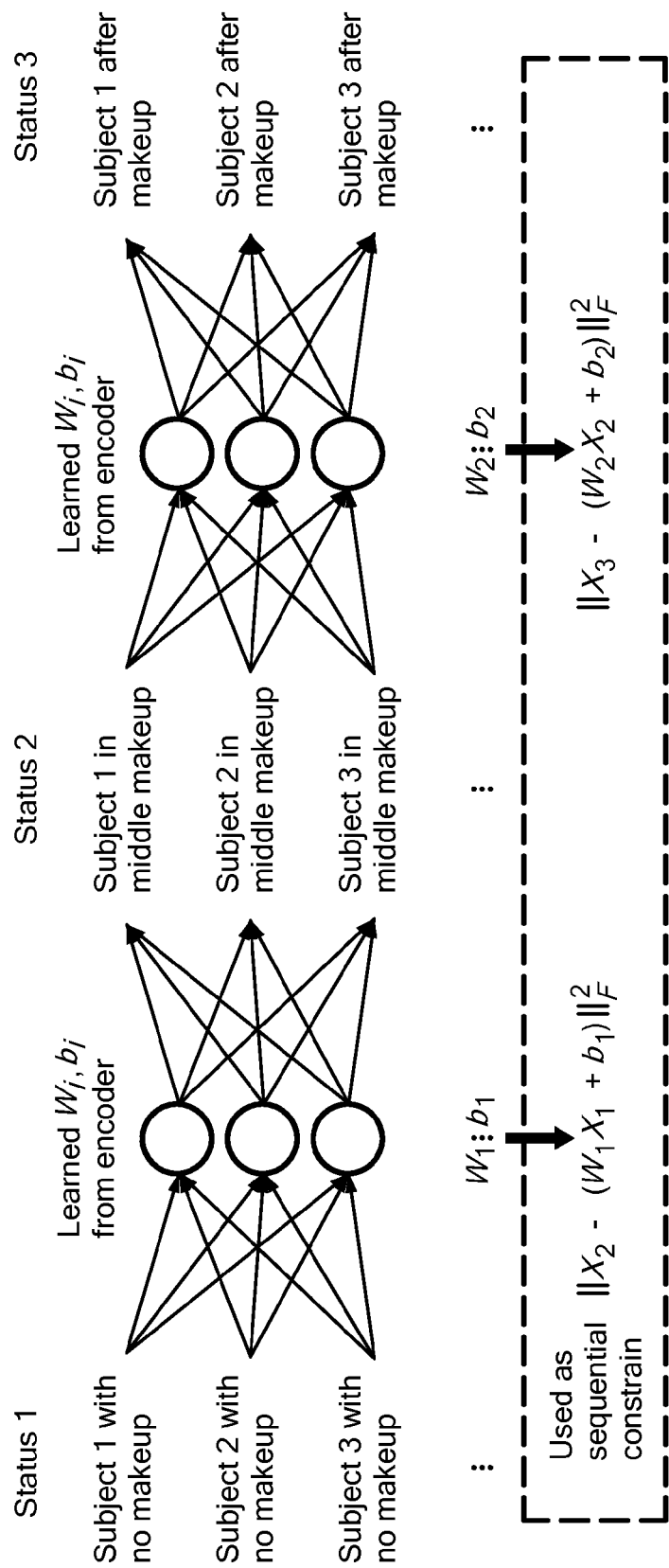
FIG. 7 is an illustration of a sequential dictionary learning model, in which all subjects should have similar changes from a previous statue to the next statue, and a deep autoencoder is introduced for calculating the initial estimation of each projection matrix and modal.

In one embodiment, a locality-constrained low-rank dictionary learning method is used for training the system, as described further below, and referring also to FIGS. 5-7.

A. Makeup Detection

In one embodiment, the present system and method use a discriminative dictionary learning algorithm with low-rank regularization to improve the performance even when large noise exists in the training samples. Moreover, locality constraint is added to take place of sparse coding to exploit the manifold structure of local features in a more thorough manner. In addition to the description below, other details of a discriminative dictionary learning algorithm with low-rank regularization can also be found in [35].

1. Discriminative Low-Rank Dictionary Learning

Given a set of training data $Y=[Y_1, Y_2, \ldots, Y_c]$, $Y \in \mathbb{R}^{d \times N}$, where c is the number of classes (mouth, eye, with makeup, without makeup, and the like), d is the feature dimension (e.g., number of pixels), N is the number of total training samples, and $Y_i \in \mathbb{R}^{d \times n_i}$ is the samples from class i which has $n_i$ samples. From Y, we want to learn a discriminative dictionary D and the coding coefficient matrix X over D, which is used for future classification tasks. Then we can write Y=DX+E, where E is the sparse noises. Rather than learning the dictionary as a whole from all the training samples, we learn a sub-dictionary $D_i$ for the i-th class separately. Then X and D could be written as $X=[X_1, X_2, \ldots, X_c]$ and $D=[D_1, D_2, \ldots, D_c]$ where $D_i$ is the sub-dictionary for the i-th class, and $X_i$ is the sub-matrix that is the coefficients for representing $Y_i$ over D.

Sub-dictionary $D_i$ should be endowed with the discriminability to well represent samples from i-th class. Using mathematical formula, the coding coefficients of $Y_i$ over D can be written as $X_i=[X_i^1, X_i^2, \ldots, X_i^c]$, where $X_i^j$ is the coefficient matrix of $Y_i$ over $D_j$. The discerning power of $D_i$ comes from the following two aspects: first, it is expected that $Y_i$ should be well represented by $D_i$ but not by $D_j$, $j \neq i$. Therefore, we will have to minimize $\|Y_i - D_i X_i^i - E_i\|_F^2$. At the same time, $D_i$ should not be good at representing samples from other classes; that is each $X_j^i$, where $j \neq i$ should have nearly zero coefficients so that $\|D_i X_j^i\|_F^2$ is as small as possible. Thus we denote the discriminative fidelity term for sub-dictionary $D_i$ as follows:

$$R(D_i, X_i) = \|Y_i - D_i X_i^i - E_i\|_F^2 + \sum_{j=1, j \neq i}^{C} \|D_i X_j^i\|_F^2. \qquad (1)$$

In the task dealing with face images, the within-class samples are linearly correlated and lie in a low dimensional manifold. Therefore, a sub-dictionary should be properly trained as low-rank to represent samples from same class. To this end, we want to find the one with the most concise atoms from all the possible sub-dictionaries $D_i$, that is to minimize the rank of $D_i$. Recent research in low-rank and sparse representation ([2]) suggests that the rank function can be replaced by the convex surrogate, that is $\|D_i\|_*$, where $\|\cdot\|_*$ denotes the nuclear norm of a matrix (i.e., the sum of singular values of the matrix).

2. Locality Constraint

As suggested by local coordinate coding (LCC) [43], locality is more essential than sparsity under certain assumptions, as locality must lead to sparsity but not necessarily vice versa. Specifically, the locality constraint uses the following criteria:

$$\min_x \lambda \|l_i \odot x_i\|^2, \quad \text{s.t. } 1^T x_i = 1, \forall i, \qquad (2)$$

where $\odot$ denotes the element-wise multiplication, and $l_i \in \mathbb{R}^k$ is the locality adaptor that gives different freedom for each basis vector proportional to its similarity to the input sample. Specifically, $$l_i = \exp\left(\frac{dist(y_i, D)}{\sigma}\right). \qquad (3)$$

where $dist(y_i, D)=[dist(y_i, d_1), \ldots, dist(y_i, d_k)]^T$, and $dist(y_i, d_j)$ is the Euclidiean distance between sample $y_i$ and each dictionary atom $d_i \cdot \sigma$ controls the bandwidth of the distribution.

Considering the discriminative reconstruction term, the low-rank regularization term on the sub-dictionaries and the locality-constrained on the coding coefficients all together, we have the following LC-LRD model for each sub-dictionary:

$$\min_{D_i, X_i, E_i} R(D_i, X_i) + \alpha \|D_i\|_* + \beta \|E_i\|_1 + \lambda \sum_{k=1}^{n_i} \|l_{i,k} \odot x_{i,k}\|^2 \quad (4)$$

$$\text{s.t.} \quad Y_i = DX_i + E_i$$

Solving the proposed objective function in Equation (4) is considered by dividing it into two sub-problems: First updating each coefficient $X_i$ (i=1, 2, . . . , c) one by one by fixing dictionary D and all other $X_j$ (j≠i) and putting together to get coding coefficient matrix X; second, updating by fixing others. These two steps are iteratively operated to get the discriminative low-rank sub-dictionary $D_i$, the locality-constrained coefficients $X_i$, and the sparse error $E_i$. The details of the coefficient updating can be referred to Algorithm 1 below. In contrast to traditional locality-constrained linear coding (LLC) [40], an error term is added which can handle large noise in samples. For the procedure of updating sub-dictionary, a method such as in [35] can be used.

---

Algorithm 1 Updating coefficients via ALM

Input: Training data $Y_i$, Initial dictionary D,
   Parameters $\lambda$, $\sigma$, $\beta_i$
Initialize: $Z = E_i = P = 0$, $\mu = 10^{-6}$, $\mu_{max} = 10^{30}$, $\rho = 1.1$, $\epsilon = 10^{-8}$, maxiter = $10^6$, iter = 0
while not converged and iter ≤ maxiter do
1.  Fix others and update Z by:

$$Z = Y_i - E_i + \frac{P}{\mu}$$

2.  Fix other and update $X_i$ by:
    $X_i$ = LLC (Z , D, $\lambda$, $\sigma$)
3.  Fix others and update by:

$$E_i = \underset{E_i}{\operatorname{argmin}} \left( \frac{\beta_1}{\mu} \|E_i\|_1 + \frac{1}{2} \left\| E_i - \left( Y_i - DX_i + \frac{P}{\mu} \right) \right\|_F^2 \right)$$

4.  Update multipliers P by:
    $P = P + \mu(Y_i - DX_i - E_i)$
5.  Update parameter by:
    $\mu = \min(\rho\mu, \mu_{max})$
6.  Check the convergence conditions:
    $\|Y_i - DX_i - E_i\|_\infty < \epsilon$
end while
output: $X_i$, $E_i$

---

In step 2, of Algorithm 1, Z, D, $\lambda$ and $\sigma$ are set as the input of LLC [40]. The code can be downloaded from http://www.ifp.illinois.edu/jyang29/LLC.htm.

B. Makeup Decomposition

To the best of the inventors' knowledge, this is the first system and method that recovers a face without makeup from a face with makeup by automatically removing the cosmetics. The makeup decomposition problem can be formulated as follows: given an makeup image $X_m$, how to recover the associated image $X_n$ without makeup? This is different from prior art work, which is primarily an image processing problem that is trying to add makeup to a nude face using a makeup example. The present problem is much more difficult, since the original face has been almost fully covered up by cosmetics, which makes this an ill-conditioned problem. Makeup, however, can be categorized into some standard styles, which can benefit the present makeup decomposition by learning these styles from training data. To solve this challenging problem, we propose a dictionary learning method called Sequential Dictionary Learning (SDL).

1. Preprocessing

Accurate pixel-wise alignment is necessary for successful face synthesis, since we learn pair-wise dictionaries which requires corresponding face regions in before and after makeup. To establish a standard training dataset in one embodiment, a face image size of 150×130 is used and the data is aligned automatically by 83 landmarks extracted, for example, through Face++ [31]. (The Face++ Research Toolkit can be downloaded from http://www.faceplusplus.com/.) These fiducial points define an affine warp, which is used in a thin plate spline method (see for example [28]) to warp the images into a canonical form.

As can be seen, the makeup styles are usually complicated or varied in the dataset and in practical application. Some faces may only have lipstick on the mouth while other faces may have eye shadow and face foundation. That makes it impossible to recover all kinds of makeup by training only one pair of dictionaries. Therefore, different pairs of dictionaries should be assigned to different face regions as well as different makeup styles. For that reason, we separate the whole face into four regions (facial skin, mouth, left/right eye, left/right eyebrow) in the preprocessing step.

2. Sequential Dictionary Learning

For the situation in which the same style makeup procedure is used, all subjects should have similar changes from a previous status to the next status. Therefore, it is reasonable to assume that there exists a similar transformation matrix from the previous coefficients to the next for each sample. In SDL, we employ dictionaries to seek for the projection between the adjacent statuses. Once the projections between each pair of coefficients are learned, we can perform the makeup decomposition by relying on the relationship in the learned sparse coefficients. In contrast to SCDL [41], the present system has multiple steps in the dictionary learning, and also requires an estimation of each step for initialization.

The sequence is first illustrated in a simple two-step situation. Denote by $X_m$ and $X_n$ the training datasets formed by the image patch pairs of makeup and non-makeup. The energy function below is minimized to find the desired sequential dictionary:

$$\min_{D_m, D_n, P, E_m E_n} \|X_m - D_m C_m - E_m\|_F^2 + \beta_m \|E_m\|_1 + \|X_n - D_n C_n - E_n\|_F^2 + \quad (5)$$

$$\beta_n \|E_n\|_1 + \gamma \|C_m - PC_n\|_F^2 + \lambda_m \|C_m\|_1 + \lambda_n \|C_n\|_1 + \lambda_P \|P\|_F^2$$

$$\text{s.t.} \quad \|d_{m,i}\|_{l_2} \leq 2, \|d_{n,i}\|_{l_2} \leq 2, \forall i$$

where $\gamma$, $\lambda_m$, $\lambda_n$ and $\lambda_p$ are regularization parameters to balance the terms in the objective function and $d_{m,i}$, $d_{n,i}$ are the atoms of $D_m$ and $D_n$, respectively. The above Equation (5) can be alternatively optimized using an iterative algorithm. When the sequence extends to multiple steps, one pair is updated once and iteratively run until convergence.

Figure 11:
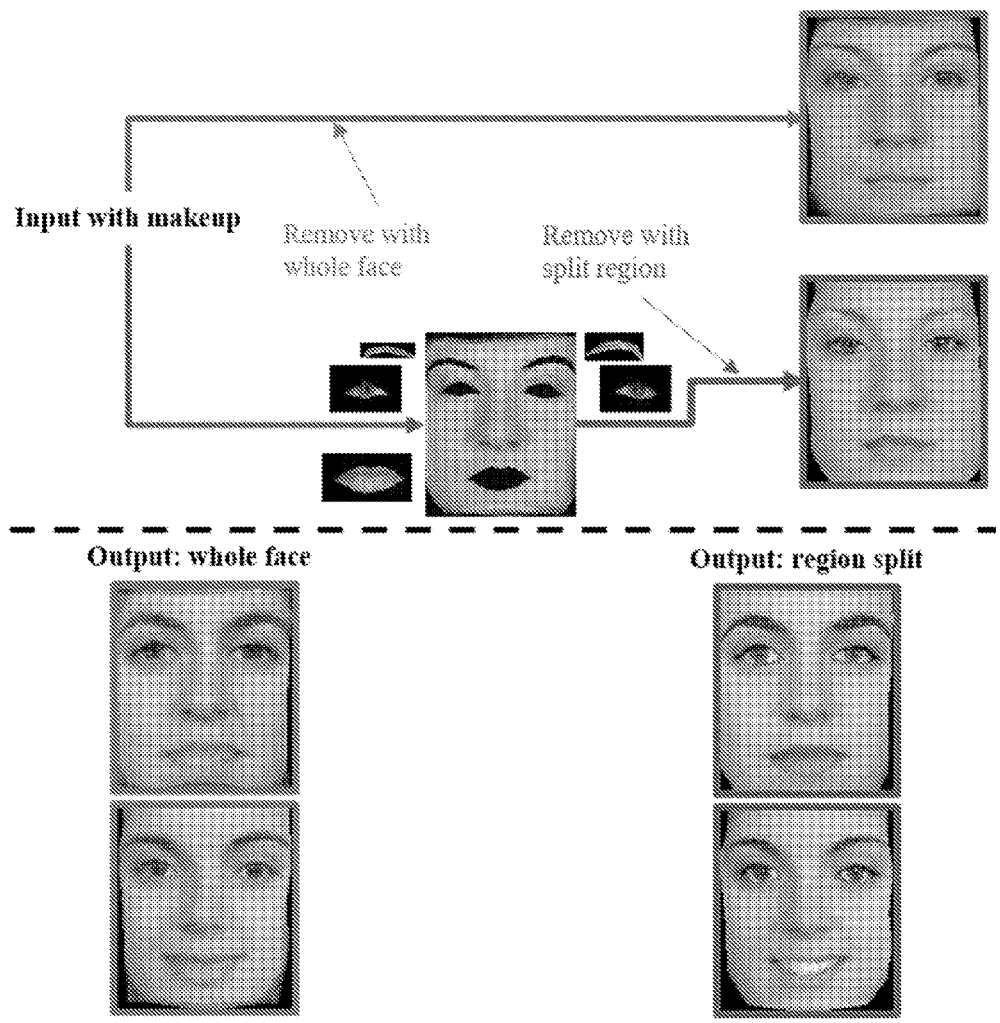
FIG. 11 illustrates examples of improved results using region separation from three examples from the VMU dataset; the upper examples show two ways of makeup removal: removal from the whole face, and removal from separated regions; the lower two rows show two more examples.

In the synthesis part of SDL, an initial estimation of $X_n$, is needed. Different from the original SCDL paper, where the problem is image super-resolution which can be initialized by bi-cubic interpolation, the present makeup removal problem requires a more sophisticated way to give the initial estimation. To this end, a deep auto-encoder structure is built on training samples to get the estimated projection matrix among each status, thereby calculating the initial estimation of $X_n$. FIG. 11 gives an illustration of the proposed initialization method.

3. Synthesis with Poisson Editing and Ratio-Image Merging

Since the preprocessing step warps the face into a canonical form and only retains the central part of the face, to make the result more realistic, it requires a warping back and a seamless blending procedure to replace the reconstructed part in original image. In one embodiment, a Poisson image editing method can be used to blend the makeup removal face into an original image. In addition, another advantage brought in with is that the extent of makeup removal could be adjusted freely through a parameter in Poisson editing. See [38] for additional details regarding Poisson image editing.

One phenomenon that has been observed in the experiments is that some individual facial textures like wrinkles are smoothed out in the makeup removal face due to the dictionary reconstruction. Therefore, after the above makeup removal image has been obtained, one more technique called ratio-image merging can be introduced to solve this problem and make the final results more like the original subject. For example, in the facial expression mapping problem, the ratio-image is extracted from a pair of images with and without expression as reference, then added on a geometric warping image, which has more subtle changes in illumination and appearance. See [34] for additional details regarding ratio-image merging.

More particularly, given images for one subject with and without makeup face surfaces A and B, for any point p on a surface A, there is a corresponding point on B which has the same meaning. Assume there are m point light sources and each has the light direction from p denoted as $d_i$, $1 \le i \le m$, and its intensity denoted as $l_i$. Suppose the surface is diffuse, under the Lambertian model, the intensity at p is $$I = \rho \sum_{i=1}^{m} I_i n \cdot d_i, \qquad (6)$$

where, n denotes its normal vector. and $\rho$ is the reflectance coefficient at p.

After the surface is deformed, which could be considered as a face with wrinkles, the intensity at p becomes $$I' = \rho \sum_{i=1}^{m} I_i n' \cdot d_i', \qquad (7)$$

From Eq. (6) and Eq. (7), we have $$\frac{I_a'}{I_a} = \frac{\sum_{i=1}^{m} I_i n_a' \cdot d_{ia}'}{\sum_{i=1}^{m} I_i n_a \cdot d_{ia}}, \quad \frac{I_b'}{I_b} = \frac{\sum_{i=1}^{m} I_i n_b' \cdot d_{ib}'}{\sum_{i=1}^{m} I_i n_b \cdot d_{ib}} \qquad (8)$$

for surface A and B at each point.

In the present case, wrinkles are transferred between the same subject with or without makeup, whose surface normals at the corresponding positions are roughly the same, that is, $n_a \approx n_b$ and $n_a' \approx n_b'$. And since the two images are in the same pose, the lighting direction vectors are also the same, that is, $d_{ia} = d_{ib}$ and $d_{ia}' = d_{ib}'$. Under this assumption, we have $$\frac{B'(x, y)}{B(x, y)} = \frac{A'(x, y)}{A(x, y)} \qquad (9)$$

where (x, y) are the coordinates of a pixel in the images. Therefore, we have $$B'(x, y) = B(x, y) \frac{A'(x, y)}{A(x, y)} \qquad (10)$$

In summary, given a person's makeup image A, a smoothing filter is first applied on some regions without makeup but that usually have wrinkles, such as eye bags, corners of the mouth, the forehead, to get A'. Once the makeup removal image B is obtained, the final image with more detailed texture could be set pixel by pixel through Equation (10).

C. Datasets

Datasets of images of human faces with makeup, with no makeup, and, for training purposes, with intermediate steps of makeup application, can be obtained from any suitable source. In one example, the database introduced by Dantcheva et al. and Chen et al. [2, 3] was utilized, which are YouTube MakeUp (YMU) database, Virtual MakeUp (VMU) database and Makeup in the wild database (MIW). However, these databases only have before and after makeup images for each subjects. In order to facilitate this study of sequential dictionary learning, a face dataset was accordingly assembled with stepwise makeup labeled for every sub-region makeup statues. These datasets are first introduced as follows.

1. Existing Datasets

YMU: This dataset is obtained from YouTube video makeup tutorials, captured the face images of 151 Caucasian female subjects before and after the application of makeup (99 subjects were used in work [4]). Basically, there are four shots per subject—two shots before the application of makeup and two shots after the application of makeup. The total number of images in the dataset is 600, with 300 makeup images and 300 no-makeup images. The database is relatively unconstrained, exhibiting variations in facial expression, pose and resolution.

MIW: This dataset is obtained from the Internet, and contains 154 unconstrained face images of subjects with and without makeup corresponding to 125 subjects (77 with makeup, and 77 without makeup). Since the images are obtained from the Internet, this database is referred to as Makeup In the Wild.

VMU: This dataset is another virtual generated dataset. The VMU dataset is modified to simulate the application of makeup by synthetically adding makeup to 51 female Caucasian subjects in the Face Recognition Grand Challenge (FRGC) dataset available from the National Institute of Standards and Technology. The makeup is added by using a publicly available tool from Taaz.com. Three virtual makeovers were created: (a) application of lipstick only; (b) application of eye makeup only; and (c) application of a full makeup comprising lipstick, foundation, blush and eye makeup. Hence, the assembled dataset contains four images per subject: one before-makeup shot and three after makeup shots.

2. Collected Dataset

A newly built dataset called Stepwise Makeup Dataset is also introduced. This is a dataset of female face images in step-by-step procedures of makeup, which have been collected for studying the relationship between faces with and without makeup. Different from the existing makeup datasets, which only contain images of faces before and after the application of makeup, this dataset focus on the procedure of applying makeup starting from an original face with no makeup to a fully made-up face.

Figure 8:
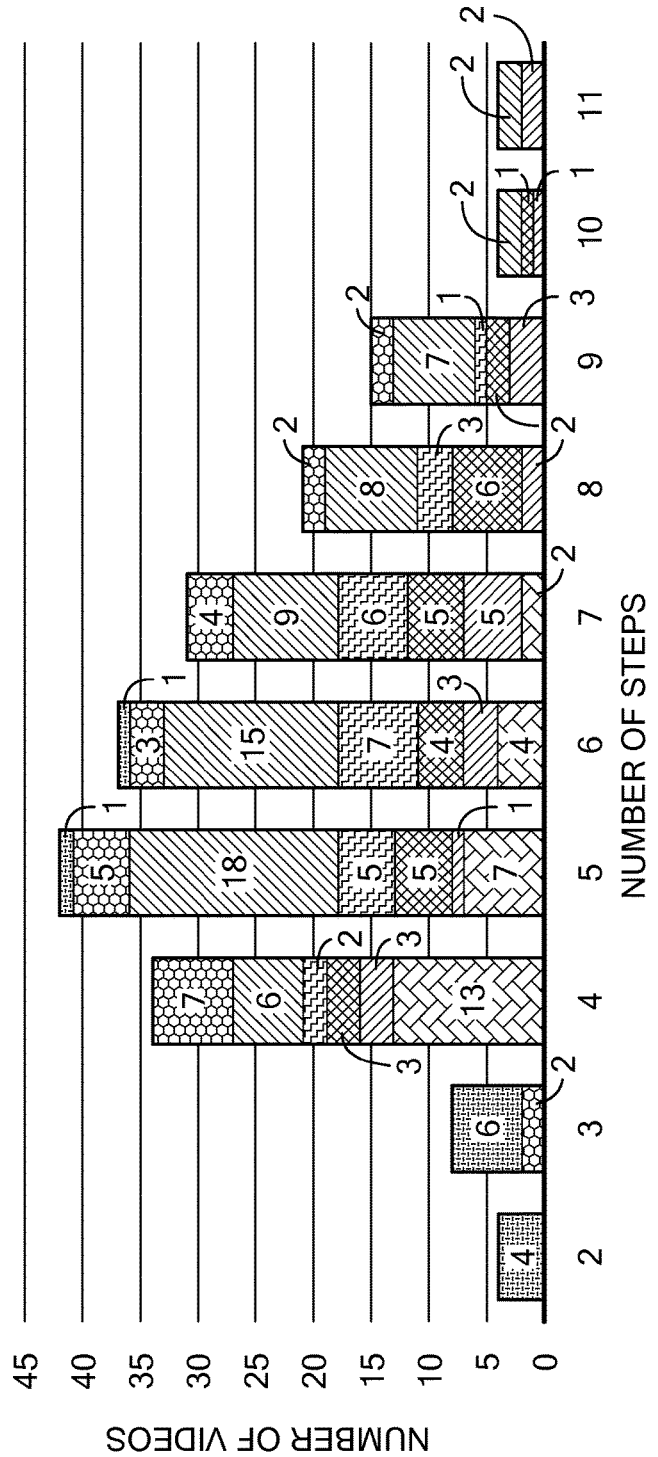
FIG. 8 illustrates the distribution of the number of makeup steps in 200 videos in the Collected Dataset.

The dataset is assembled from YouTube makeup video tutorials. Each subject could have several kinds of makeup methods, and for each method images are captured of the subjects in at least four makeup steps. For the majority of subjects, five or six steps are captured; for some subjects, even more then 10 steps are captured. FIG. 8 shows the distribution of the number of steps in this collected dataset. The makeup in this procession changes from subtle to heavy. The cosmetic alteration is mainly in the eye region and lip region, and additional changes are on the quality of the skin due to the application of foundation. The illumination condition in each procedure is reasonably constant since different steps are obtained from the same video of the same subject. This dataset includes some variations in expression and pose, but should preferably be frontal face and without obscuration.

The makeup video tutorials were downloaded from YouTube, then automatically processed frame by frame to discard non-frontal or obscured images. Duplicates were removed by detecting images that contained a high ratio of similar SIFT (scale-invariant feature transform) descriptors. The remaining frames are the key frames of different makeup steps. It will be appreciated that the image tutorials in other makeup websites can also be directly included in as makeup steps. The whole dataset is finally organized by identity, makeup method and step-by-step order from an original face without makeup to a fully made-up face. Therefore the label information attached with each image includes identity, makeup number and step number. This makeup procedure dataset contains a variety of makeup techniques and their procedures. Possible makeup items are listed in Table 1, above.

Figure 9:
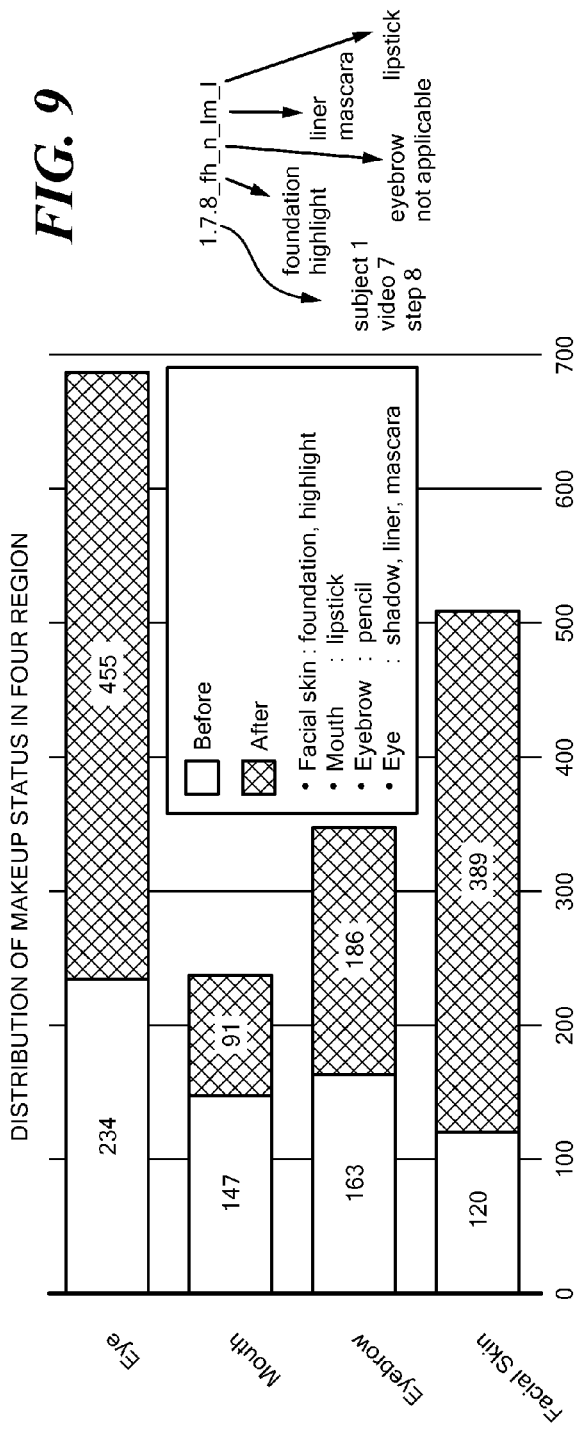
FIG. 9 is a statistical graph of four regions' subsets and an example to show the usage of label information; each image's label identifies the subject, video, step, facial skin region, eyebrow region, eye region, and mouth region.

This dataset is labeled with information regarding each region's makeup status. This label method provides two advantages: 1) it allows the construction of a subset of makeup procedures in four different face regions, and 2) one image can be used several times in the context of different region makeup status. In FIG. 9, a statistical analysis is given of four subsets and an example is provided of how to assign and use the label information.

D. Experiments

In order to evaluate the system's performance, that is makeup detection and makeup decomposition, two kinds of experiments were employed. First, for the makeup detection and recognition, various experiments were conducted to ascertain the effectiveness of the present LC-LRD method compared with some other classification methods. Next, the performance of SDL on makeup decomposition is demonstrated on VMU and the collected dataset. This also provides insights into the present system and method through visual examples. Finally, the impact of the makeup decomposition is further illustrated by performing face verification on both before and after makeup samples.

1. Makeup Detection

A 5-fold cross-validation scheme is employed in order to evaluate the performance of the proposed makeup detector. 4 folds are used for training the makeup detector, and the remaining fold is used for testing it. This is repeated 5 times. Note that the subjects in the training set are not present in the test set. The performance of the makeup detector is reported using classification rate. For three existing datasets, the makeup detection is done on the entire face since there is no label information on the region makeup. For the collected dataset, makeup detection is done both on regions and the entire face. A number of other classifiers were also experimented with. The four classifiers that resulted in the best performance and are reported below.

YMU, MIW and VMU Databases. In this section, the performance of the proposed makeup detection system is evaluated on the three existing databases. Here, the YMU dataset is divided into 5 folds with approximately 120 images in each fold, the MIW with approximately 30 images in each fold, while the VMU dataset is approximately 40 subjects in each fold. In Table 2, the comparison results are shown of the present LC-LRD method, along with LRC (linear regression classifier) [37], LDA (linear discriminative analysis) [26], and SVM [3] on raw pixel data. As can be seen, the present dictionary learning method performs better for all the datasets.

TABLE 2

Average recognition rate (%) of different algorithms on YMU, MIW and VMU datasets, the input is raw pixel. Dictionary initialized with PCA (principle component analysis).

| Dataset | YMU | MIW | VMU |
| --- | --- | --- | --- |
| LC-LRD | 91.59 ± 3.71 | 91.41 ± 3.94 | 93.75 ± 1.04 |
| LRC [37] | 79.29 ± 4.28 | 87.73 ± 2.15 | 92.73 ± 3.61 |
| LDA [26] | 89.61 ± 3.05 | 52.74 ± 13.78 | 91.67 ± 2.76 |
| SVM [3] | 87.08 ± 1.38 | 89.14 ± 6.38 | 91.33 ± 5.57 |

Collected SMU Databases. For the collected SMU dataset, the makeup detection is done on four sub-regions where cosmetics are most commonly applied. Table 3 shows the detection results of the four sub-regions and the average rate; the present LC-LRD method performs best in all but one case. From the above experiments, the present system's acceptable ability to detect makeup and locate cosmetic regions is shown.

TABLE 3

Average recognition rate (%) of different algorithms on SMU datasets, the input is raw pixel. Dictionary initialized with PCA (principle component analysis).

| Sub-region | Facial skin | Eye region | Mouth | Eyebrow | Average |
| --- | --- | --- | --- | --- | --- |
| LC-LRD | 82.40 ± 4.29 | 84.36 ± 2.67 | 86.51 ± 4.85 | 72.71 ± 2.81 | 81.49 |
| LRC [37] | 77.37 ± 0.92 | 71.71 ± 3.20 | 74.12 ± 6.73 | 78.38 ± 6.82 | 75.39 |
| LDA [26] | 50.52 ± 8.41 | 62.54 ± 5.48 | 72.34 ± 11.75 | 58.91 ± 13.76 | 61.08 |
| SVM [3] | 77.34 ± 3.99 | 80.90 ± 0.73 | 79.57 ± 5.75 | 79.21 ± 4.28 | 79.25 |

2. Makeup Decomposition

Figure 10:
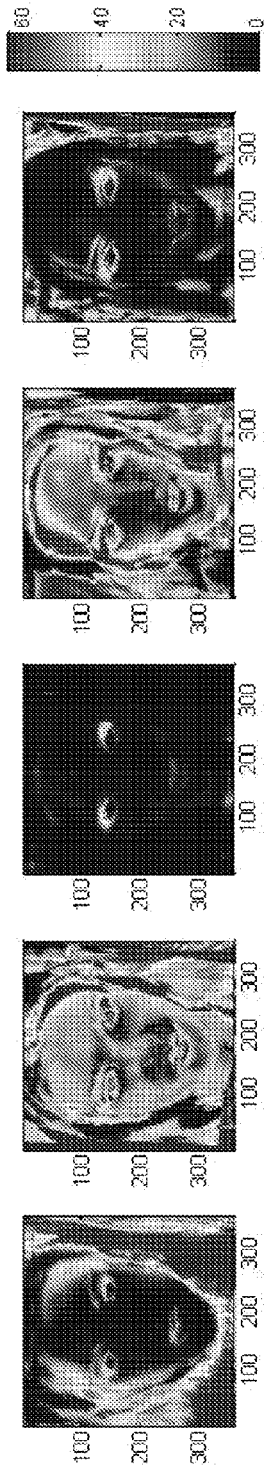
FIG. 10 illustrates examples of cluster distributions in makeup style; each sub-figure shows the distribution of a cluster.

Due to the complex structures in images of different styles, learning only one pair of dictionaries and an associated linear mapping function is often not enough to cover all variations of makeup decomposition. For example, the mapping in the mouth region may vary significantly from the mapping in the eye region. Therefore multi-model should be learned to enhance the robustness, that is different pairs of dictionaries should be assigned to different face regions. Furthermore, due to the variety of makeup styles, several pairs of projection are needed even for just one region. Intuitively, pre-clustering could be conducted to separate training data into several groups so that the linear mapping in each group can be more stably learned. In one embodiment, the whole face is first separated into four regions, and for each region, SDL is run separately. For each region of SDL, the system integrates a K-means clustering to select the makeup style. However, we only have the image with makeup in the synthesis stage, and coupled clustering for model seeking cannot be conducted directly. To solve this problem, a non-makeup image can be initialized with trained auto-encoder, and then the assigned cluster updated iteratively in the SDL procedure. FIG. 10 shows some examples of cluster distributions in makeup styles.

FIG. 11 shows the different results with and without region separation from the VMU dataset. It can be seen that the removal results on the mouth and eyebrows have some improvement, and the eyeball is more clearly compared with whole remove. The overall result also looks better. The lower two rows show two more examples.

Figure 12:
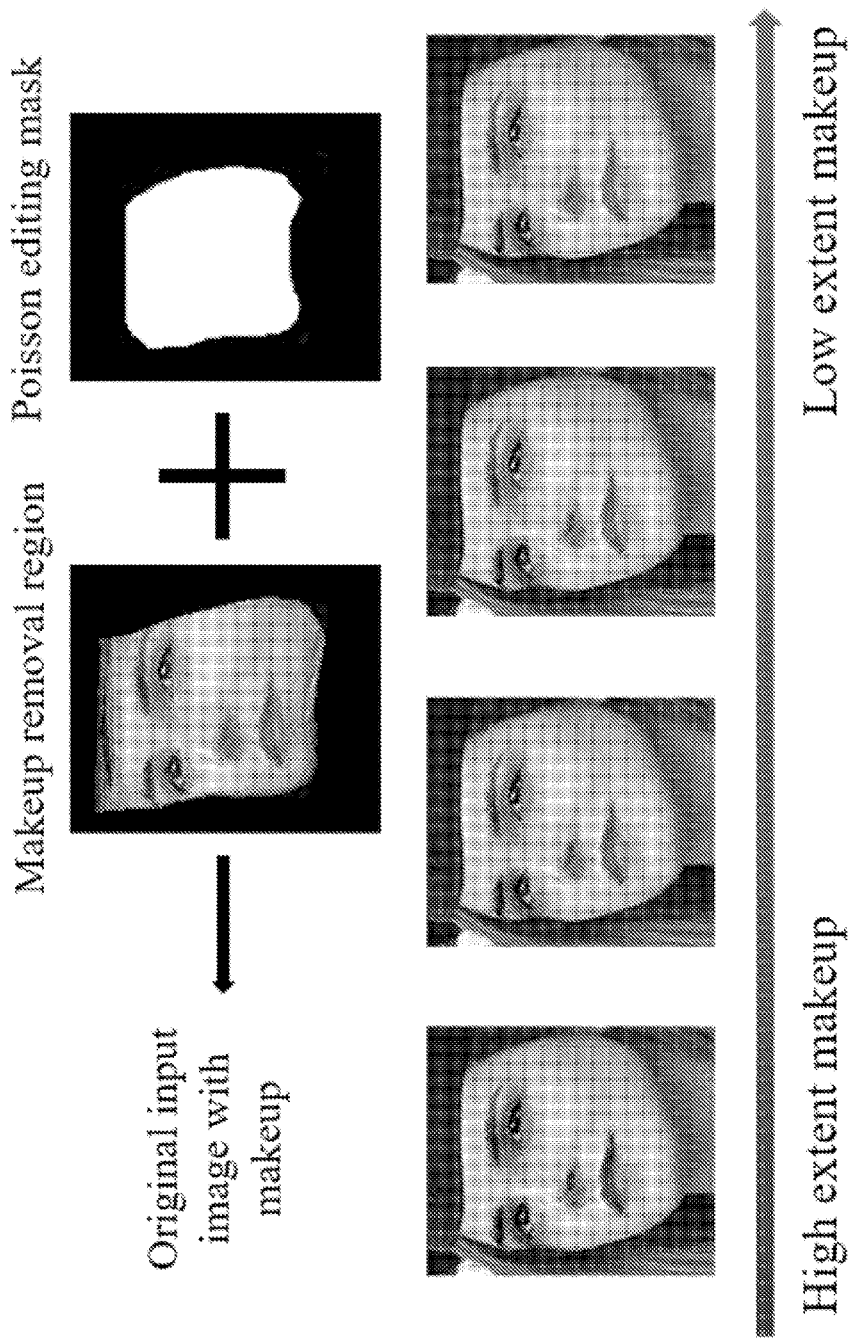
FIG. 12 illustrates examples of Poisson editing; the upper row shows the target, insert and mask images for blending; the lower row gives an example of adjusting makeup extent through Poisson editing.

For the Poisson editing part, a mask image is needed to assign the blending part of insert image. Since fiducial landmarks are already present for each image, this mask image can be automatically generated using the landmarks constraint. One example of target, insert and mask images is presented in the first row of FIG. 12. As mentioned previously, using Poisson editing could even let us modify the makeup extent easily by choosing a different value of Poisson editing's parameter. An example of changing the extent of makeup form high to low is shown in the second row of FIG. 12.

Figure 13:
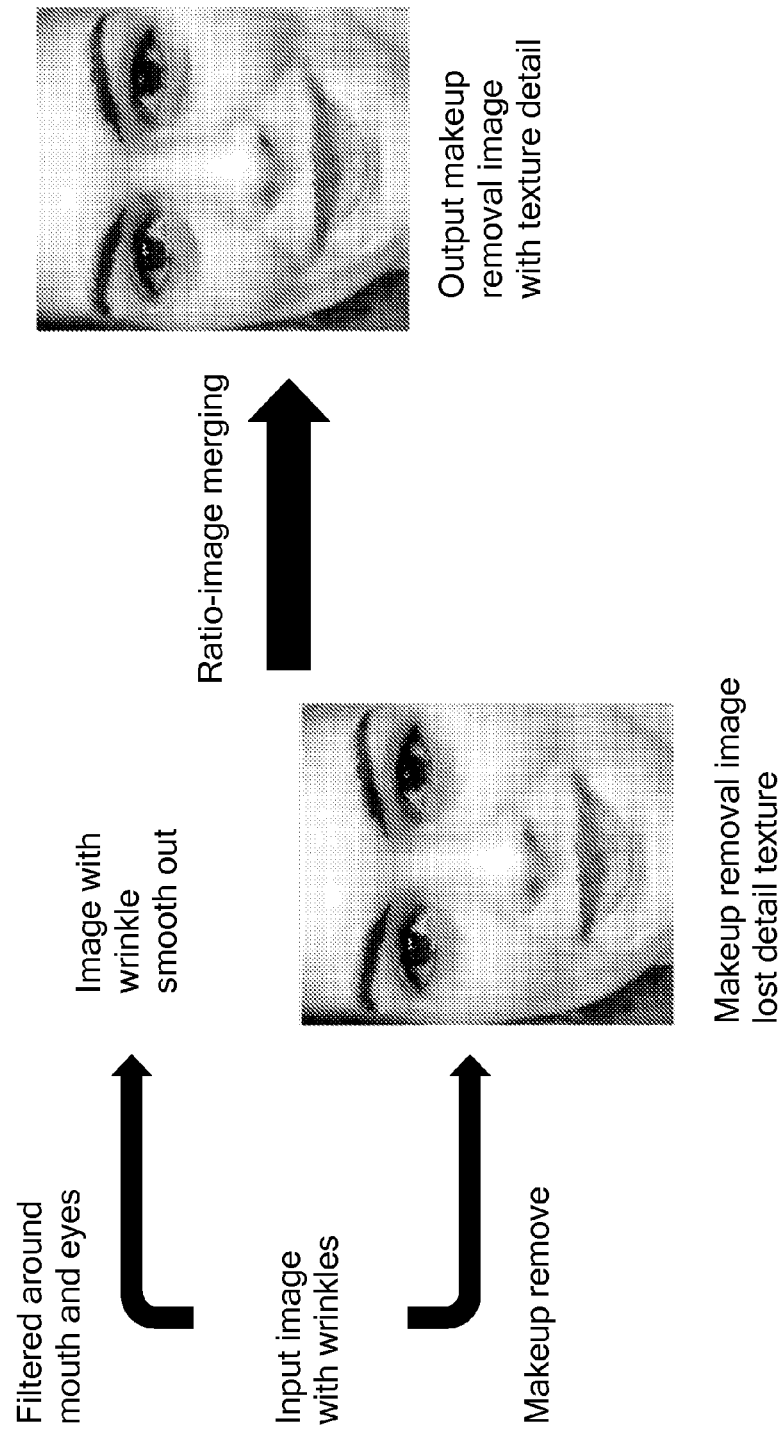
FIG. 13 illustrates an example of ratio-image merging to deal with wrinkles; the wrinkles from the left original image have been successfully copied to the output makeup removal images on the right.

At the last step of makeup removal, a ratio-image merging method is introduced to produce more realistic results by adding wrinkles to the non-makeup face. FIG. 13 illustrates the wrinkles copy by ratio-image merging. It can be seen that the wrinkles around the eyes and mouth have been exactly copied to the output makeup removal image, which makes the results more like the original person.

Figure 14:
FIG. 14 provides more examples of makeup removal results from the VMU dataset (left) and the Collected Dataset (right); for these eight examples, the left column is the input makeup image, the right column is the output makeup removal image, and the middle column is the ground truth non-makeup image.

FIG. 14 shows the decomposition results for the makeup removal. Examples of makeup removal results on the VMU datatset are shown on the left and on the Collected Dataset on the right. For these eight examples, the left column is the input makeup image, the right column is the output makeup removal image, and the middle column is the ground truth non-makeup image.

It should be noted that there are many other preprocesses, such as color space split, that can be added into the present method.

3. Face Verification with Makeup Removal

In this section, the use of the proposed makeup detection and removing system is described in the context of face recognition. In [29], the authors showed that the recognition performance of face matchers decreases when matching makeup images against their no-makeup counterparts. In order to address this issue, a pre-processing routine is devised. The effect of makeup is suppressed by first detecting the makeup and then using a decomposed non-makeup image to help with face verification.

Figure 15:
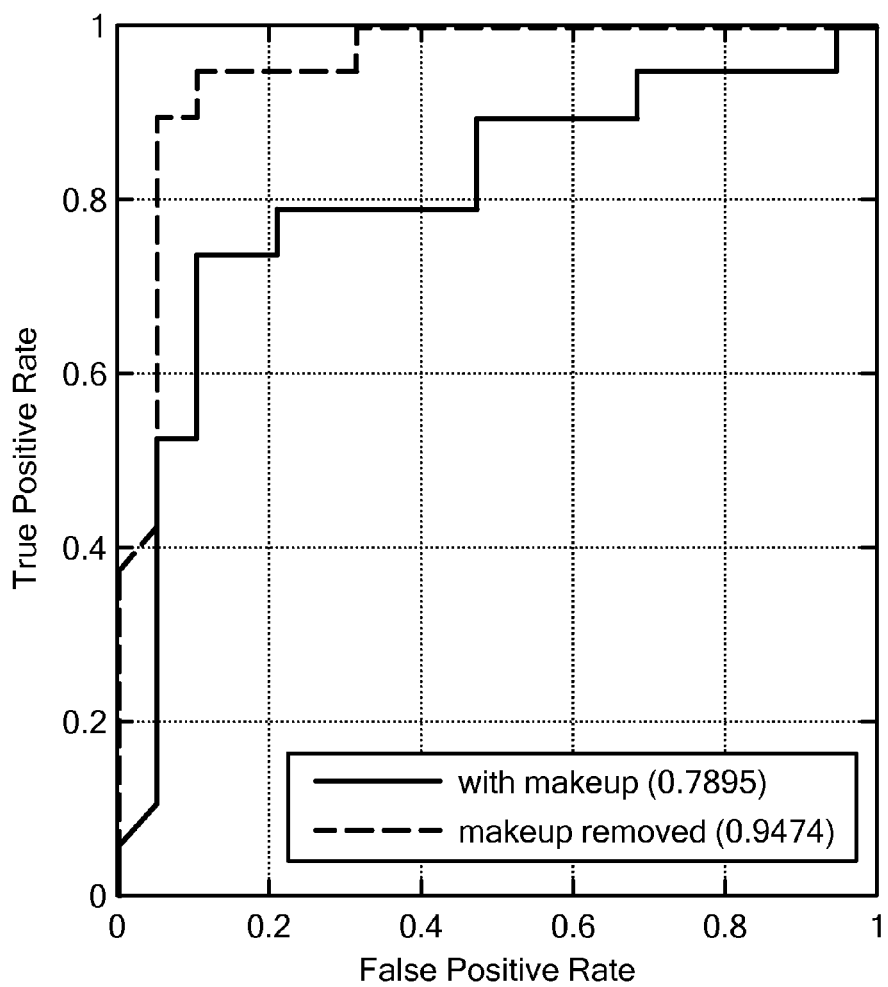
FIG. 15 illustrates an ROC curve and verification results by SVM; with the preprocessing of makeup removal, the verification results obtain an improvement up to 15%.

Referring to FIG. 15, the performance of the makeup detector is reported using a Receiver Operating Characteristic (ROC) curve: Here, the true positive rate (TPR: the percentage of "makeup" images that are correctly classified as "makeup") is plotted as a function of the false positive rate (FPR: the percentage of "no-makeup" images that are incorrectly classified as "makeup"). Face verification performance after applying the proposed face pre-processing scheme results in an improvement up to 15%.

In another aspect of the present invention, facial attractiveness is assessed with a computer-based system and method incorporating attractiveness-aware encoders and robust late fusion.

Figure 16:
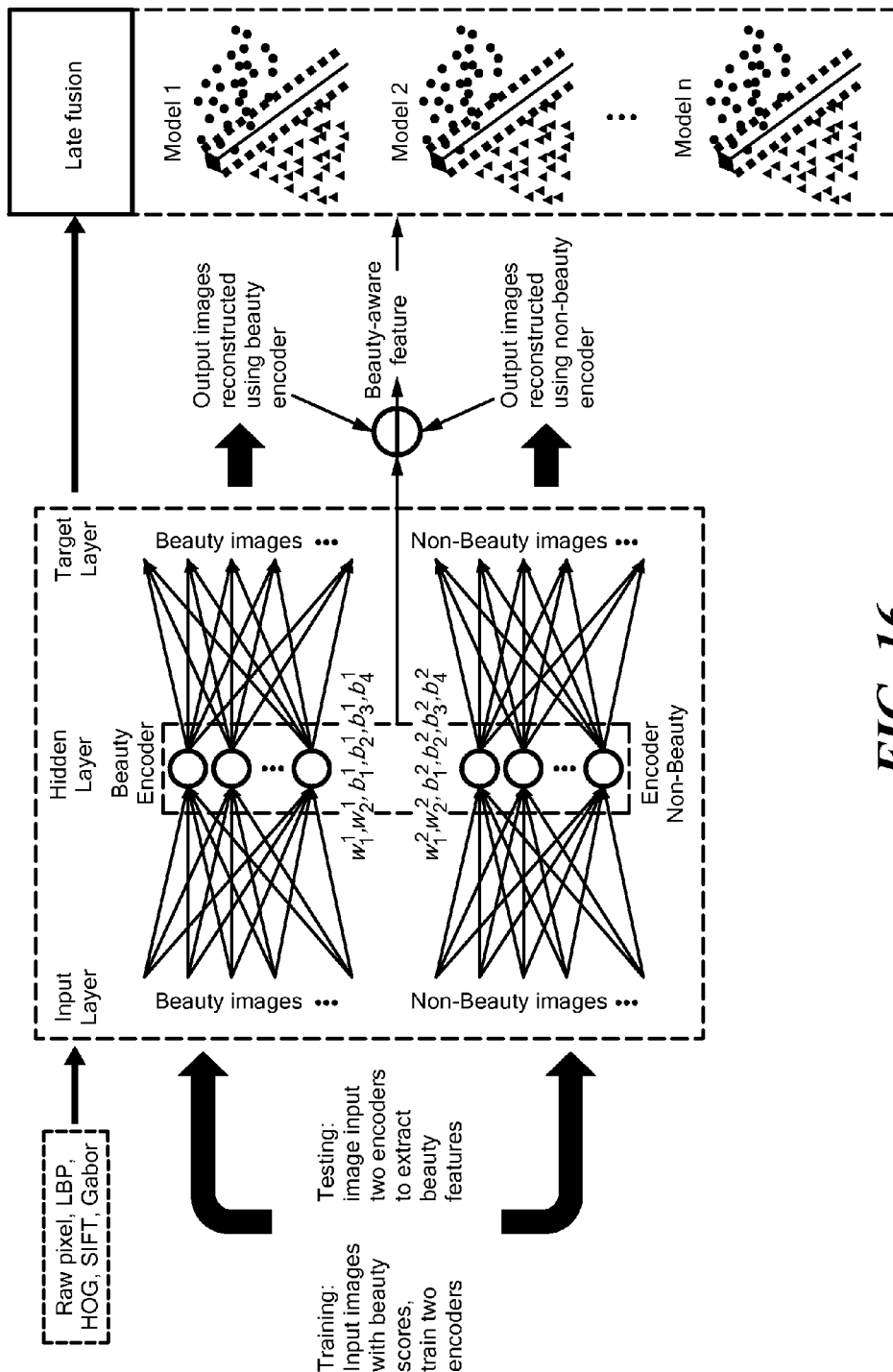
FIG. 16 is a schematic illustration of a framework of an attractiveness prediction system and method.

Facial attractiveness is of everlasting interest in art and social science. It also draws considerable attention from the multimedia community. Referring generally to FIG. 16, the present system employs a framework emphasizing attractiveness-aware features extracted from a pair of auto-encoders to learn a human-like assessment of facial beauty. The system is fully automatic, does not require any landmarks and puts no restrictions on the faces' pose, expressions, and lighting conditions. Therefore the system is applicable to a larger and more diverse dataset. To this end, first, a pair of autoencoders is built respectively with beauty images and non-beauty images, which can be used to extract attractiveness-aware features by putting test images into both encoders. Second, the performance of the system is enhanced using an efficient robust low-rank fusion framework to integrate the predicted confidence scores that are obtained based on certain kinds of features. The attractiveness-aware model with multiple layers of auto-encoders produces appealing results and performs better than previous appearance-based approaches.

A. Attractiveness Modeling

There are several ways to model the attractiveness of human beauty based on facial images [19]: (1) geometry-based method, (2) appearance-based method, and (3) hybrid method. To adapt the present model to most practical scenarios, only the facial appearance is considered to extract the low-level features: raw pixel, Eigenface, local binary pattern (LBP), scale invariant feature transform (SIFT), and Gabor filter.

The above hand-craft visual descriptors have been successfully adopted in face recognition, object recognition/detection, video analysis, However, how to better utilize them for facial attractiveness representation is still an open question. Direct application of these features may only reveal the identity information of the subject rather than attractiveness. The present system therefore uses an auto-encoder to further refine the low-level features, and seek for attractiveness-aware representations.

1. Building Autoencoders

Suppose we have $n_m$ facial images with labels "more attractive" and $n_l$ images with labels "less attractive", and their low-level feature representation are $[x_1, x_2, \ldots, x_{n_m}]$, $[x_1, x_2, \ldots, x_{n_l}]$, $x \in \mathbb{R}^D$ where D is the dimensionality of the visual descriptor. There are two important nonlinear transform functions in the feed-forward process of the autoencoder. The first one is responsible for "input→hidden units", while the second one for the "hidden units→output". We denote the two transforms as: $T_1: a_i = \sigma(W_1 x_i + b_1)$, and $T_2: h(x_i) = \sigma(W_2 a_i + b_2)$, respectively, where $W_1 \in \mathbb{R}^{d \times D}$, $b_1 \in \mathbb{R}^d$, $W_2 \in \mathbb{R}^{D \times d}$, $b_2 \in \mathbb{R}^d$, and $\sigma$ is the sigmoid function, which has the form $\sigma(x)=(1+e^{-x})^{-1}$. The autoencoder is essentially a single layer hidden neural network, but with identical input and output, meaning the auto-encoder encourages the output to be as similar to the input as possible, namely, $$\min_{W_1,b_1,W_2,b_2} L(x) = \min_{W_1,b_1,W_2,b_2} \frac{1}{2n}\sum_i \|x_i - h(x_i)\|_2^2, \qquad (11)$$

where n is the number of images. In this way, the neurons in the hidden layer can be seen as a good representation for the input, since they are able to reconstruct the data with fewer elements.

To avoid over-fitting of the autoencoder, two extra terms are introduced: a regularization term, and a KL divergence term that enables high dimensionality of the hidden layer by avoiding trivial solutions of the identity function. Then the model in Equation (11) is reformulated as:

$$\min_{W_1,b_1,W_2,b_2} L(x) + \lambda_1(\|W_1\|_2^2 + \|W_2\|_2^2) + \lambda_2 \sum_{i=1}^{d} KL(\rho \| \hat{\rho}_i), \qquad (12)$$

where $\|\cdot\|_2^2$ is the square of the Frobenius norm of a matrix, $KL(\cdot)$ is the KL divergence (Kullback-Leibler divergence), $\hat{\rho}_i$ is the average of the activation of the ith hidden unit $$\left(\hat{\rho}_i = \frac{1}{n}\sum_j a_j^{(\rho)}\right),$$

and $\rho$ is a very small number, say 0.05. The intuition behind the KL divergence is to suppress the values of the activation of the hidden units, and therefore avoid arbitrary large values. In practice, we solve this unconstraint optimization problem using an L-BFGS optimizer (limited-memory Broyden-Fletcher-Goldfarb-Shanno) which enables large-scale data to be addressed with limited memory. See [20] for additional details regarding L-BFGS optimization.

The above auto-encoder can be formulated in a deep structure by a layer-wise training scheme. That is, the first layer autoencoder is trained and then its hidden units are used as the input and output of the second layer autoencoder. This process is continued until the number of the layers is reached. In this attractiveness modeling, two separate deep auto-encoders are trained by the rating of the images, meaning one auto-encoder uses more attractive faces as both inputs and outputs while another one uses less attractive images as both inputs and outputs.

2. Attractiveness-Aware Representation

Figure 17:
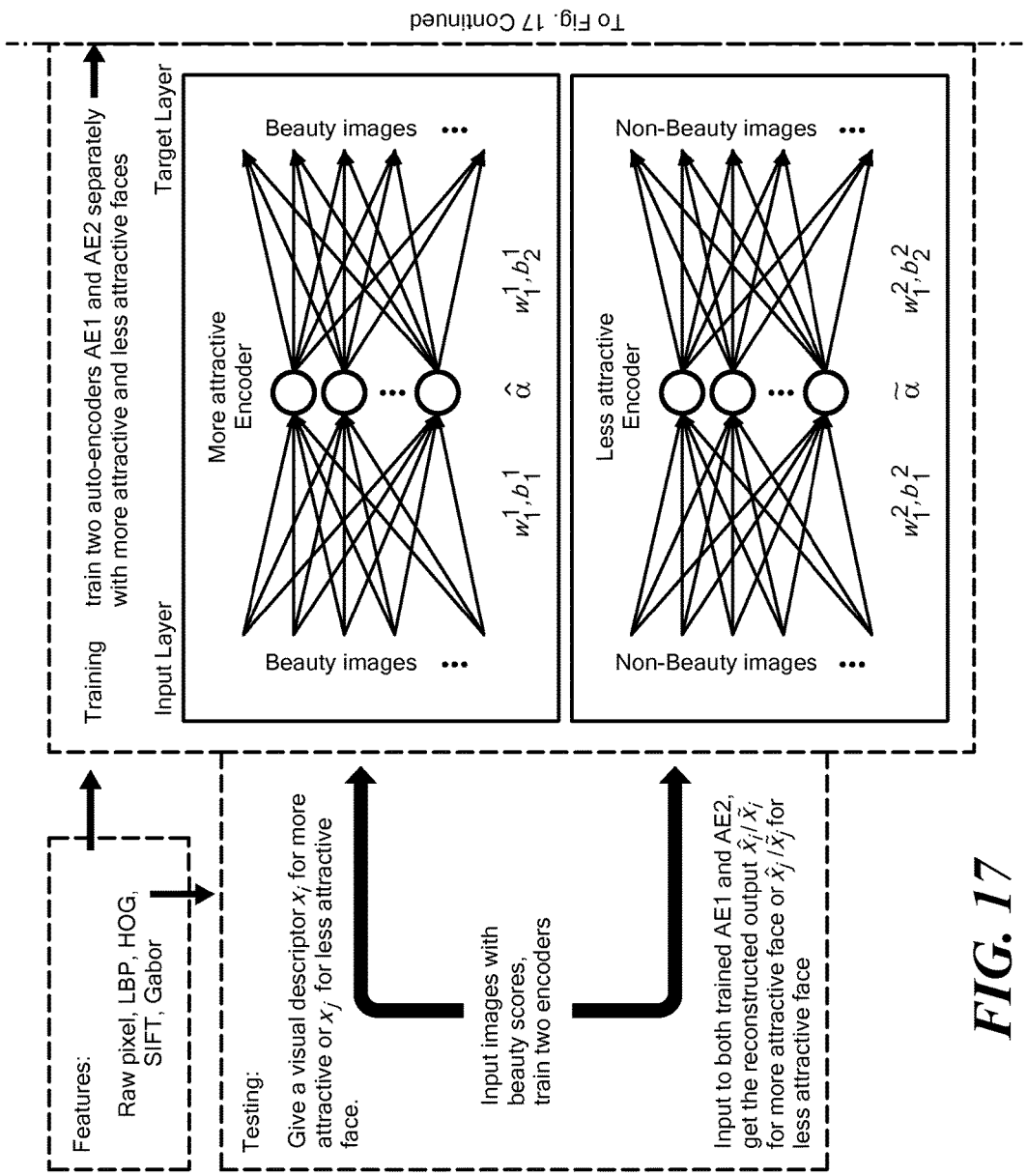
FIG. 17 is a further schematic illustration of a framework of an attractiveness prediction system and method.
Figure 17:
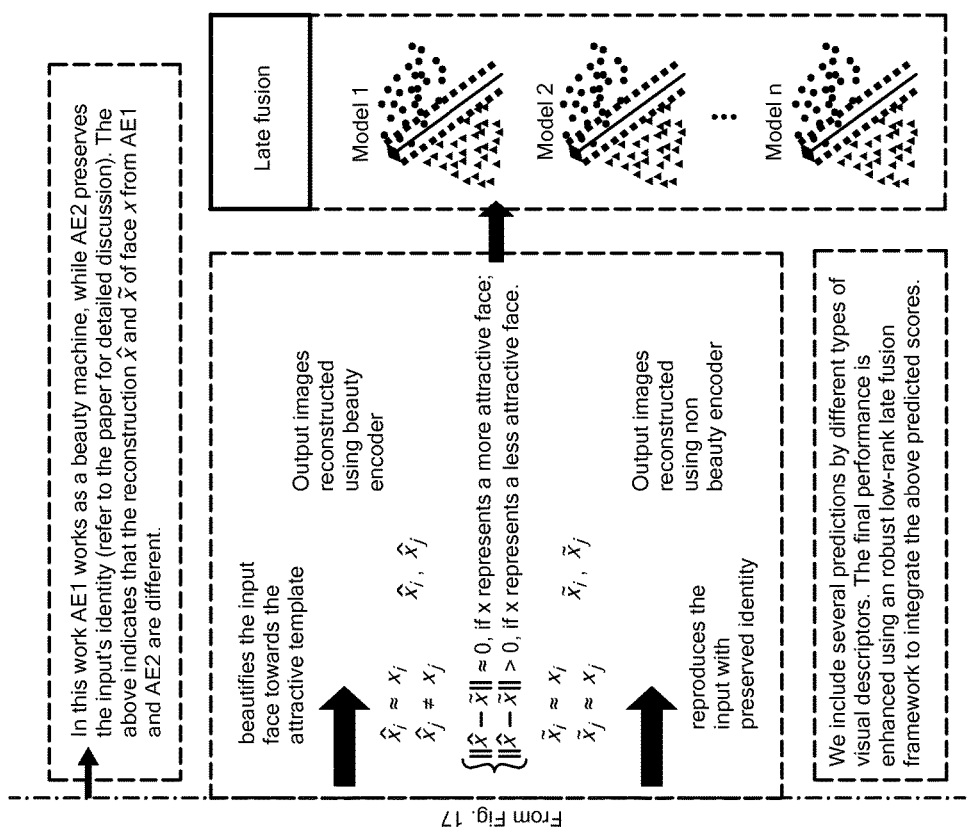

Referring to FIG. 17, suppose two autoencoders $AE_1$ and $AE_2$ have learned more attractive and less attractive faces, respectively. Then, two attractiveness representations can be extracted for any test. An interesting phenomenon is that attractive faces have many common characteristics while less attractive faces are more diverse. This suggests that the reconstructions for the test images from $AE_1$ and $AE_2$ may render differently. This is because attractive faces are more similar, and the reconstruction of $AE_1$ beautifies the input face towards the attractive template learned during the training On the other hand, the diversity of less attractive faces leads to nothing but an identity function, meaning $AE_2$ always reproduces the input.

The above discussion indicates that the reconstructions of more attractive and less attractive faces from $AE_1$ and $AE_2$ are different. Suppose $x_i$ is the visual descriptor for an attractive face while $x_j$ is the visual descriptor for a less attractive face. Since two auto-encoders have been trained for both more and less attractive faces, then use $\hat{x}$ as the output of $AE_1$, and use $\tilde{x}$ as the output of $AE_2$, respectively. Therefore, the above assumption can be explicitly modeled as:

$$\hat{x}_i \approx x_i, \ \tilde{x}_i \approx x_i, \ \hat{x}_j \neq x_j, \ \tilde{x}_j \approx x_j. \qquad (13)$$

These relations may feature the attractiveness of the test face, as $AE_2$ always reproduces the input, but the $AE_1$ beatifies the input by generating an attractive face. In other words, the difference of the outputs between the $AE_1$ and $AE_2$ is meaningful if the following relations are considered:

$$\begin{cases} \|\hat{x} - \tilde{x}\| \approx 0, & \text{if } x \text{ represents a more attractive face;} \\ \|\hat{x} - \tilde{x}\| > 0, & \text{if } x \text{ represents a less attractive face.} \end{cases} \qquad (14)$$

Therefore, the vector $\hat{x}-\tilde{x}$ can be a good attractiveness-aware representation.

B. Low-Rank Late Fusion

The criterion shown in Equation (14) is a good indicator for attractiveness prediction with any appropriate visual descriptor. However, we may include more than one prediction by different types of visual descriptors: Raw pixel, Eigenface, LBP, SIFT, and Gabor filter. In addition, not all the facial partitions are equally critical to the attractiveness decision. The predictions from either different visual descriptors or different partitions feature different aspects of the attractiveness, but also incur controversy, since the results may disagree with each other. This introduces an interesting problem called late fusion that studies how to fuse prediction results from different models or classifiers.

Suppose we have n test samples, and each of them has m scores from m different models. Therefore, these results constitute an m×n score matrix Y with each score as an element. Since the rows represent the scores from different classifiers, they should potentially have consistence, meaning the row space of the matrix is not very large, and the rank of Y is low. Therefore, we propose a novel representation that can better describe the row space of the score matrix, and in turn reveal the intrinsic structure of Y and prediction results. Since Y has the rationale to be a low-rank matrix, it can be reconstructed by itself as well as another low-rank co-efficient matrix Z, under a mild condition:

$$\min_Z \text{rank}(Z), \quad \text{s.t.} \ Y = YZ. \qquad (15)$$

However, the above problem is non-convex due to the introduction of rank minimization. Most recent research work uses the nuclear norm as the convex surrogate of the original problem, and solves the following convex problem instead:

$$\min_Z \|Z\|_* + \lambda \|E\|_{2,1}, \quad \text{s.t.} \ Y = YZ + E. \qquad (16)$$

where $\|\cdot\|_*$ is a matrix nuclear norm, is a balancing parameter, $\|E\|_{2,1} = \Sigma_i \|E_{:,i}\|_2$ and E compensates for the part that deviates from the low-rank structure. The solution of the above is non-trivial and unique if the column space of Y is sufficiently large. For details, refer to [18].

To train a classifier for attractiveness predictions, we also need to transform the training data into the representation similar to the test data. Therefore, we use $Y=[Y_l, Y_u]$ instead in Equation (16), where $Y_l$ and $Y_u$ represent the score matrix of the labeled and unlabeled data.

C. Experiments

The system and method have been evaluated by conducting attractiveness score assessment experiments, meaning that each algorithm gives a human-like score prediction. Pearson's correlation is used to quantitatively measure the predicted scores using human rating scores as ground truth.

1. Dataset and Experimental Setting

The same dataset as in Davis et al. [13] and Sutic et al. [22] was used to evaluate the method. The images and corresponding attractiveness scores have been collected from the website www.hotornot.com, and pre-processed by White et al. [23]. In the pre-processing, automatic face detection is applied on each image and followed by an alignment procedure that maps the faces onto canonical locations. The resulting database contains 2253 female images and 1745 male images. Each person in the dataset has an assigned beauty rating in the range of 1 to 10, which is the average score from at least 50 votes. The rectified images were downsampled to 86 by 86 pixels.

To generate more/less attractive datasets, a boundary value is used to split the original database into two equal parts. Note that 2056 female photos were used in this experiment, and the boundary value is 7.9 (median of all scores). This split leads to 1028 more attractive faces and 1028 less attractive faces. From the two splits, 514 more attractive images and 514 less attractiveness images (1028 in total) were randomly chosen as training data and the remaining 1028 images as testing data.

2. Results and Analysis

Attractiveness score assessment: Several popular visual descriptors are considered to extract the low-level features: Raw pixel, Eigenface, LBP, SIFT, and Gabor filter. Then five pairs of auto-encoders are built by respectively employing the five descriptors as both the model's input and output. For each pair of auto-encoders, two kinds of attractiveness-aware features are extracted. The first feature is a direct application of the autoencoder that concatenates the hidden units of two autoencoders as the new representation. The second feature is the proposed attractiveness-aware representation that uses the vector $\hat{x}-\tilde{x}$ as the new representation. Finally, the two representations are fed into ridge-regression to predict test images' attractiveness scores.

Figure 18B:
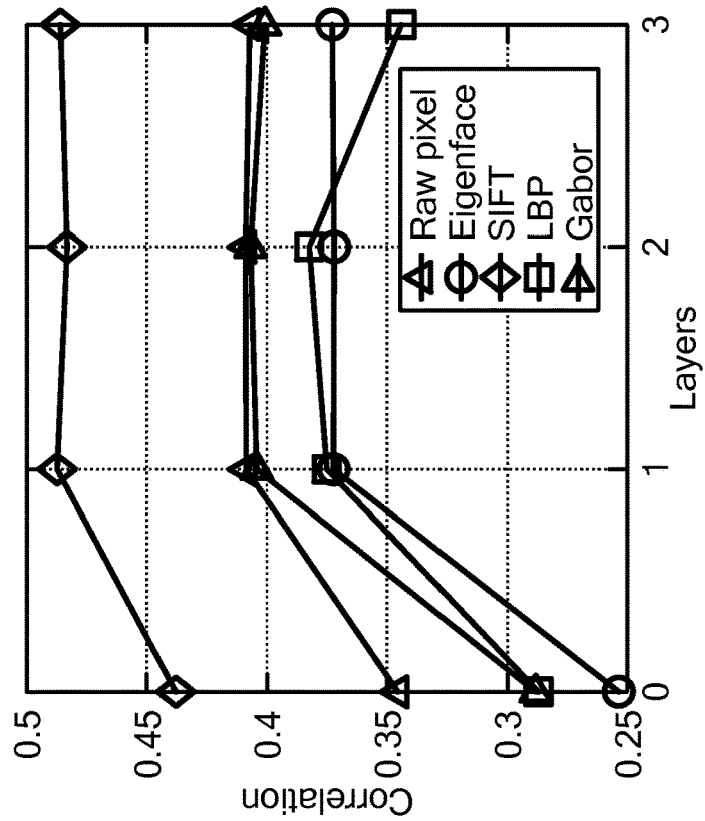
FIGS. 18A and 18B illustrate the assessment correlation of the present system and method with different numbers of hidden layers (Layers=1, 2, 3); Layers=0 means four visual descriptors are directly used for the assessment.
Figure 18A:
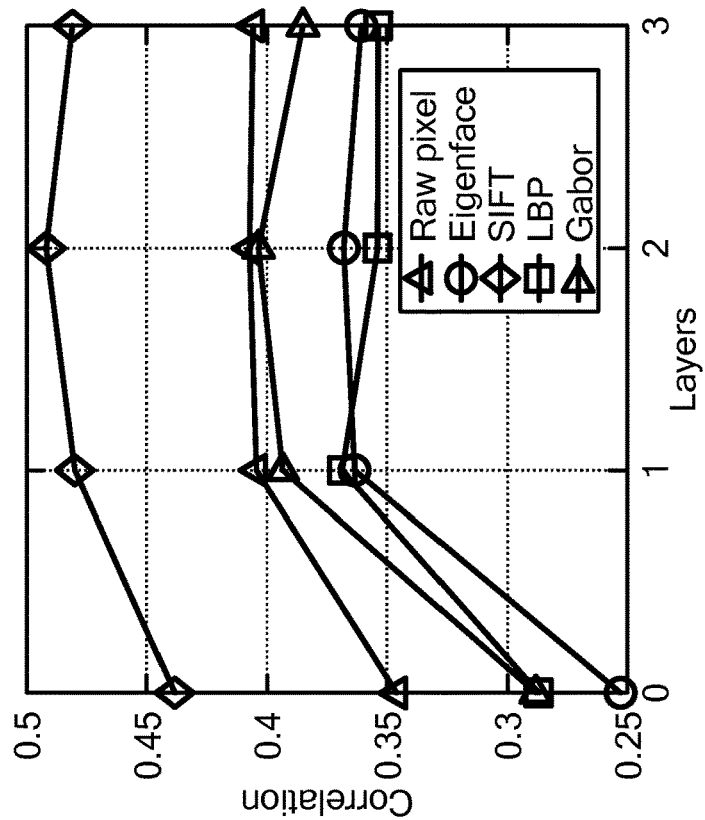

FIGS. 18A and B show the results of two proposed representations with different numbers of hidden layers. The baseline is shown at "Layer=0" where the regression model is trained directly by hand-craft descriptors [24, 22, 25]. Note that FIG. 18A shows the results of the concatenation of hidden units, while FIG. 18B is the representation using the difference between two outputs of the autoencoder pair. As can be seen, for all visual descriptors, the two proposed representations achieve better results, which suggests that attractiveness-aware features obtained from the present model gives a better representations of facial beauty.

The Low-Rank Late Fusion (LRLF) scheme can be employed to fuse the ranking scores from m regression ranking models, each of which is trained with one specific attractiveness-aware feature. The advantage of this fusion scheme is that it is not only isotonic to the numeric scales of scores from different models but also removes the prediction errors from each model.

In the experiments, 1028 test samples are used, and each of them has 10 scores from 5 different descriptors (each visual descriptor produces two attractiveness-aware features and corresponding scores). Furthermore, in addition to using the whole face, the impact of face patches, i.e., upper half, lower half, left half, and right half of the face, is exploited. Therefore, these results constitute a 1028×50 score matrix Y with each score as an element. Then, a low-rank representation on the matrix is applied, and the learned low-rank coefficient matrix Z is used as the new fused feature. Table 4 shows the result of using LRLF on 50 scores. It can be concluded that the system performs better with robust late fusion. Note for each patch, two rows' results are associated with two attractiveness-aware features using $[\hat{a}, \tilde{a}]$ and $\hat{x}-\tilde{x}$, respectively. It can be seen that the difference between two representations is not large.

TABLE 4

Correlation score of different features on different patches along with the final fused results

| Patch | Raw pixel | Eigenface | SIFT | LBP | Gabor |
|---|---|---|---|---|---|
| Whole | 0.4068 | 0.3679 | 0.4927 | 0.3691 | 0.4036 |
| | 0.4090 | 0.3729 | 0.4876 | 0.3822 | 0.4065 |
| Upper | 0.3530 | 0.3152 | 0.3957 | 0.3376 | 0.3880 |
| | 0.3426 | 0.3107 | 0.4110 | 0.3703 | 0.3631 |
| Lower | 0.3385 | 0.3392 | 0.4364 | 0.3099 | 0.3498 |
| | 0.3303 | 0.3140 | 0.4457 | 0.2921 | 0.3402 |
| Right | 0.3035 | 0.3134 | 0.4444 | 0.2520 | 0.3739 |
| | 0.2876 | 0.3241 | 0.4548 | 0.2908 | 0.3677 |
| Left | 0.3765 | 0.3814 | 0.4262 | 0.3364 | 0.4219 |
| | 0.3530 | 0.3695 | 0.4411 | 0.3578 | 0.4359 |
| Fused | | | 0.5343 | | |

Other than the above dataset, the present system and method were also evaluated in the dataset provided by Gray et al. [16], which is also downloaded from www.hotornot.com, but without alignment. Their experiment setting is followed, which uses 1028 training data and 1028 testing data for comparison. The comparison results are shown in Table 5. Note that the present auto-encoder framework can also be applied on the Gray et al. Multiscale Model to produce more attractiveness-aware features, thereby improving the assessment results.

TABLE 5

Assessment correlation of different methods

| Method | Correlation without alignment |
|---|---|
| Multiscale Model [16] | 0.425 |
| The present system and method | 0.437 |

The systems and methods described herein have commercial application in, for example, the social media, entertainment, education, security, medical industries. As examples, the system can be used in professional digital face makeup analysis/training software; web/mobile/social/fashion applications for entertainment; cultural/educational applications, such as theatrical makeup recognition; film making tools; online/mobile games; biometrics systems for security applications; forensic science application tools, such as criminal detection; online shopping recommendation and advertisement systems, such as cosmetic product advertisement; and plastic surgery software.

The systems and methods described herein can be implemented as various computer-implemented systems and methods, using one or more processors and memory, including non-transitory memory to store the datasets and instructions that upon execution cause the system to carry out the various described operations. Data, including images of human faces, can be input from various input devices, including, without limitation, a scanner, a camera, a computer, or a further processor. Output results, including images of human faces, can be output to various output devices, including, without limitation, a video display device, a computer monitor, a computer display device, a printer. The output can be transmitted to various other systems, such as a facial recognition system or a security system.

It will be appreciated that the various features of the embodiments described herein can be combined in a variety of ways. For example, a feature described in conjunction with one embodiment may be included in another embodiment even if not explicitly described in conjunction with that embodiment.

The present invention has been described with reference to the preferred embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

REFERENCES

[1] Liu, Luoqi, Hui Xu, Junliang Xing, Si Liu, Xi Zhou, and Shuicheng Yan. "Wow! you are so beautiful today!" In *Proceedings of the 21st ACM international conference on Multimedia*. ACM, 2013; pp. 3-12.
[2] Dantcheva, Antitza, Cunjian Chen, and Arun Ross. "Can facial cosmetics affect the matching accuracy of face recognition systems?" *Biometrics: Theory, Applications and Systems (BTAS), 2012 IEEE Fifth International Conference on*. IEEE, 2012; pp. 1-2, 5-6.
[3] Chen, Cunjian, Antitza Dantcheva, and Arun Ross. "Automatic facial makeup detection with application in face recognition." *Biometrics (ICB), 2013 International Conference on*. IEEE, 2013, pp. 1-8.
[4] Guodong Guo, Lingyun Wen, and Shuicheng Yan. "Face Authentication with Makeup Changes". In *TCSVT*, 2013, pp. 2-3.
[5] How to Apply Makeup. http://www.wikihow.com/Apply-Makeup.
[6] S. Shafer. Using color to separate reflection components. *Color Research & Application*, 10 (4):210-218, 1985.
[7] Guo, Dong, and Terence Sim. "Digital face makeup by example." *Computer Vision and Pattern Recognition*, 2009.
[8] Du, Hui, and Lainqing Shu. "Makeup Transfer Using Multi-Example." *Proceedings of the 2012 International Conference on Information Technology and Software Engineering*, 2013.
[9] Xu, Lin, Yangzhou Du, and Yimin Zhang. "AN AUTOMATIC FRAMEWORK FOR EXAMPLE-BASED VIRTUAL MAKEUP." *ICIP*, 2013
[10] Florea, Camelia, et al. "Eye color classification for makeup improvement." *Computer Science and Information Systems Federated Conference on. IEEE*, 2012.
[11] P. Aarabi, D. Hughes, K. Mohajer, and M. Emami. "The automatic measurement of facial beauty." In *IEEE International Conference on Systems, Man, and Cybernetics*, volume 4, pages 2644-2647. IEEE, 2001.
[12] T. R. Alley and M. R. Cunningham. "Averaged faces are attractive, but very attractive faces are not average." 1991.
[13] B. C. Davis and S. Lazebnik. "Analysis of human attractiveness using manifold kernel regression." In *IEEE International Conference on Image Processing*, pages 109-112. IEEE, 2008.
[14] L. G. Farkas and J. C. Kolar. "Anthropometrics and art in the aesthetics of women's faces." *Clinics in Plastic Surgery*, 14 (4):599-616, 1987.
[15] K. Grammer and R. Thornhill. "Human facial attractiveness and sexual selection: The role of symmetry and averageness." *Journal of Comparative Psychology*, 108 (3):233, 1994.
[16] D. Cray, K. Yu, W. Xu, and Y. Gong. "Predicting facial beauty without landmarks." In *European Conference on Computer Vision*, pages 434-447. Springer, 2010.
[17] Y. Jefferson. "Facial beauty-establishing a universal standard." *International Journal of Orthodontics—Milwaukee—*, 15 (49-26, 2004.
[18] G. Liu, Z. Lin, S. Van, J. Sun, Y. Yu, and Y. Ma. "Robust recovery of subspace structures by low-rank representation." *IEEE Transactions on Pattern Analysis and Machine Intelligence*, 35 (1):171-184, 2013.
[19] Y. Mu. "Computational facial attractiveness prediction by aesthetics-aware features." *Neurocomputing*, 99:59-64, 2013.
[20] J. Nocedal. "Updating quasi-newton matrices with limited storage." *Mathematics of Computation*, 35 (151): 773-782, 1980.
[21] G. Rhodes. "The evolutionary psychology of facial beauty." *Anno. Rev. Psychol.*, 57:199-226, 2006.
[22] D. Sutic, 1. Breskovic, R. Huic, and I. Jukic. "Automatic evaluation of facial attractiveness." In *International Convention on Information and Communication Technology, Electronics and Microelectronics*, pages 1339-1342, IEEE, 2010.
[23] R. White, A. Eden, and M. Maim. "Automatic prediction of human attractiveness.", *UC Berkeley CS280A Project*, 1:2, 2004.
[24] J. Whitehill and J. R. .Movellan. "Personalized facial attractiveness prediction." In *IEEE International Conference on Automatic Face and Gesture Recognition*, pages 1-7, IEEE, 2008.
[25] H. Van. "Cost-sensitive ordinal regression for fully automatic facial beauty assessment." *Neurocomputing*, 129 (0):334-342, 2014.
[26] P. N. Belhumeur, J. P. Hespanha, and D. Kriegman. Eigenfaces vs. fisherfaces: Recognition using class specific linear projection. *Transactions on Pattern Analysis and Machine Intelligence*, 19 (7):711-720, 1997. 7, 8
[27] E. J. Candès, X. Li, Y. Ma, and J. Wright. Robust principal component analysis? *Journal of the ACM (JACM)*, 58 (3):11, 2011.
[28] G. Donato and S. Belongie. Approximation methods for thin plate spline mappings and principal warps. In *Transformation of Datasets in Linear-based Map Conflation Framework. Surveying and Land Information Systems*. Citeseer, 2002. 4
[29] M.-L. Eckert, N. Kose, and J.-L. Dugelay. Facial cosmetics database and impact analysis on automatic face recognition. In *Multimedia Signal Processing (MMSP), 2013 IEEE 15th International Workshop on*, pages 434-439. IEEE, 2013. 9

[30] Y. Fu, G. Guo, and T. S. Huang. Age synthesis and estimation via faces: A survey. *Pattern Analysis and Machine Intelligence, IEEE Transactions on,* 32 (11): 1955-1976, 2010. 1

[31] M. Inc. Face++ research toolkit. www.faceplusplus.com, December 2013. 4

[32] L. Li, S. Li, and Y. Fu. Learning low-rank and discriminative dictionary for image classification. *Image and Vision Computing,* 2014. 2

[33] G. Liu, Z. Lin, and Y. Yu. Robust subspace segmentation by low-rank representation. In *Proceedings of the 27th International Conference on Machine Learning (ICML-10),* pages 663-670, 2010. 2

[34] . Liu, Y. Shan, and Z. Zhang. Expressive expression mapping with ratio images. In *Proceedings of the 28th annual conference on Computer graphics and interactive techniques,* pages 271-276. ACM, 2001. 5

[35] L. Ma, C. Wang, B. Xiao, and W. Zhou. Sparse representation for face recognition based on discriminative low-rank dictionary learning. In *Conference on Computer Vision and Pattern Recognition (CVPR),* pages 2586-2593. IEEE, 2012. 2, 3, 4

[36] J. Määttä, A. Hadid, and M. Pietikäinen. Face spoofing detection from single images using texture and local shape analysis. *IET biometrics,* 1 (1):3-10, 2012. 1

[37] I. Naseem, R. Togneri, and M. Bennamoun. Linear regression for face recognition. *Transactions on Pattern Analysis and Machine Intelligence,* 32 (11):2106-2112, 2010. 7, 8

[38] P. P'erez, M. Gangnet, and A. Blake. Poisson image editing. In *ACM Transactions on Graphics (TOG),* volume 22, pages 313-318. ACM, 2003. 5

[39] P. J. Phillips, P. Grother, and R. Micheals. *Evaluation methods in face recognition.* Springer, 2011. 1

[40] J. Wang, J. Yang, K. Yu, F. Lv, T. Huang, and Y. Gong. Locality-constrained linear coding for image classification. In *Computer Vision and Pattern Recognition (CVPR), 2010 IEEE Conference on,* pages 3360-3367. IEEE, 2010. 2, 3, 4

[41] S. Wang, D. Zhang, Y. Liang, and Q. Pan. Semi-coupled dictionary learning with applications to image super-resolution and photo-sketch synthesis. In *Computer Vision and Pattern Recognition (CVPR), 2012 IEEE Conference on,* pages 2216-2223. IEEE, 2012. 2, 4

[42] M. Yang, D. Zhang, and X. Feng. Fisher discrimination dictionary learning for sparse representation. In *International Conference on Computer Vision (ICCV),* pp. 543-550. IEEE, 2011. 2

[43] K. Yu, T. Zhang, and Y. Gong. Nonlinear learning using local coordinate coding. In *Advances in neural information processing systems,* 2009, pp. 2223-2231.

What is claimed is:

1. A system for analyzing an image of a human face for the presence of makeup, comprising:
one or more processors and memory, including a dataset comprising images of human faces, the images comprising facial images of multiple human subjects, and including multiple images associated with a single human subject showing steps of makeup application including a face with no makeup, a face with an intermediate stage of makeup application, and a face with a final makeup application;
wherein the one or more processors have been trained using the dataset to predict an image of a human face without makeup from an input image of a human face wearing makeup;
machine-readable instructions stored in the memory, that upon execution by the one or more processors cause the system to carry out operations comprising:
receiving from an input device an input image of a human face wearing makeup;
detecting the presence of the makeup on the input image;
decomposing the input image to remove the makeup from the input image by applying a mapping from makeup features to non-makeup features; and
providing to an output device an output image of the human face with the makeup removed from the image.

2. The system of claim 1, further comprising categorizing the makeup on the input image into a category, wherein the categories include one or more of everyday makeup, regular makeup, fashion makeup, fashion photography makeup, fashion runway makeup, television makeup, film makeup, theatrical makeup, stage makeup, special effects makeup, airbrushed makeup, special events makeup, and high definition makeup.

3. The system of claim 1, wherein the detecting step further comprises detecting the presence of the makeup on one or more facial regions, the facial regions comprising an eye region, an eyebrow region, a lip region, and a global skin region.

4. The system of claim 1, wherein:
the detecting step further comprises detecting one or more perceptual effects of the makeup, the perceptual effects comprising skin color, eye shape, lip shape, skin texture, skin smoothness, and skin highlights;
the detected perceptual effects are classified into makeup items by the one or more processors trained with the dataset of human faces; and
the one or more processors are trained with locality-constrained low-rank dictionary learning, a support vector machine classifier, or an adaptive boosting classifier.

5. The system of claim 4, wherein:
the eye shape, the lip shape, and the skin texture are detected by one or more edge detection filters;
the skin texture is characterized by determining local binary patterns for various pixel cells on the image;
the skin smoothness is characterized by image intensity values at various pixels on the image; and
the skin highlights are characterized by determining dichromatic reflections of the skin.

6. The system of claim 1, wherein the dataset includes images separated by facial regions, the facial regions comprising one or more of an eye region, an eyebrow region, a lip region, and a global skin region.

7. The system of claim 1, further comprising one or more of:
the one or more processors are trained by sequential dictionary learning using a set of sub-dictionaries learned from the dataset, and the step of decomposing the input image to remove the makeup comprises applying a projection matrix through at least a portion of the set of sub-dictionaries;
the step of decomposing the input image comprises finding a nearest neighbor image in the dataset and removing makeup under guidance of the dataset;
the step of decomposing the input image comprises mapping makeup features on the input image to non-makeup features on the output image;
the one or more processors are trained with locality-constrained low-rank dictionary learning, a semi-coupled dictionary learning method, a Bayesian inference method, a subspace learning method, a sparse representation method, or a deep learning method.

8. The system of claim 1, further comprising, prior to the step of detecting the presence of makeup on the input image, the steps of locating fiducial landmarks on the facial image, warping the facial image into a canonical form, and splitting the facial image into facial regions;
after the step of decomposing the input image, warping the facial image back and blending to replace a reconstructed part of the image on an original image, and adding a textural detail comprising original wrinkles to the image.

9. The system of claim 1, wherein:
the input device comprises a scanner, a camera, a computer, a mobile device, or a further processor;
the output device comprises a video display device, a computer monitor, a mobile device, a printer, a facial recognition system, or a security system; and
the one or more processor and the memory are disposed on a computer, a server, or a mobile device.

10. A method for analyzing an image of a human face for the presence of makeup, comprising:
receiving an input image of a human face wearing makeup at a computer comprising one or more processors and memory, including a dataset comprising images of human faces, the images comprising facial images of multiple human subjects, and including multiple images associated with a single human subject showing steps of makeup application including a face with no makeup, a face with an intermediate stage of makeup application, and a face with a final makeup application, wherein the one or more processors have been trained using the dataset to predict an image of a human face without makeup from an input image of a human face wearing makeup;
detecting the presence of the makeup on the input image by reference to the dataset;
decomposing the input image to remove the makeup from the input image by applying a mapping from makeup features to non-makeup features in the dataset; and
providing to an output device an output image of the human face with the makeup removed from the image.

11. The method of claim 10, further comprising categorizing the makeup on the input image into a category, wherein the categories include one or more of everyday makeup, regular makeup, fashion makeup, fashion photography makeup, fashion runway makeup, television makeup, film makeup, theatrical makeup, stage makeup, special effects makeup, airbrushed makeup, special events makeup, and high definition makeup.

12. The method of claim 10, wherein the detecting step further comprises detecting the presence of the makeup on one or more facial regions, the facial regions comprising an eye region, an eyebrow region, a lip region, and a global skin region.

13. The method of claim 10, wherein:
the detecting step further comprises detecting one or more perceptual effects of the makeup, the perceptual effects comprising skin color, eye shape, lip shape, skin texture, skin smoothness, and skin highlights;
the detected perceptual effects are classified into makeup items by the one or more processors trained with the dataset of human faces; and
the one or more processors are trained with locality-constrained low-rank dictionary learning, a support vector machine classifier, or an adaptive boosting classifier.

14. The method of claim 13, wherein:
the eye shape, the lip shape, and the skin texture are detected by one or more edge detection filters;
the skin texture is characterized by determining local binary patterns for various pixel cells on the image;
the skin smoothness is characterized by image intensity values at various pixels on the image; and
the skin highlights are characterized by determining dichromatic reflections of the skin.

15. The method of claim 10, wherein the dataset includes images separated by facial regions, the facial regions comprising one or more of an eye region, an eyebrow region, a lip region, and a global skin region.

16. The method of claim 10, wherein the one or more processors are trained by sequential dictionary learning using a set of sub-dictionaries learned from the dataset, and the step of decomposing the input image to remove the makeup comprises applying a projection matrix through at least a portion of the set of sub-dictionaries.

17. The method of claim 10, wherein the step of decomposing the input image comprises finding a nearest neighbor image in the dataset and removing makeup under guidance of the dataset.

18. The method of claim 10, wherein the step of decomposing the input image comprises mapping makeup features on the input image to non-makeup features on the output image.

19. The method of claim 10, further comprising training the one or more processors with locality-constrained low-rank dictionary learning, a semi-coupled dictionary learning method, a Bayesian inference method, a subspace learning method, a sparse representation method, or a deep learning method.

20. The method of claim 10, further comprising, prior to the step of detecting the presence of makeup on the input image, locating fiducial landmarks on the facial image, warping the facial image into a canonical form, and splitting the facial image into facial regions.

21. The method of claim 20, further comprising, after the step of decomposing the input image, warping the facial image back and blending to replace a reconstructed part of the image on an original image.

22. The method of claim 10, further comprising, after the decomposing step, adding a textural detail comprising original wrinkles to the image.

23. The method of claim 10, further comprising evaluating the input image by determining suitability of a makeup style for one or more personal characteristics, for an event, or for an occasion, and wherein the memory further includes a dataset of information about cosmetic products and instructions to provide a selection of cosmetic products to emulate a makeup face.

* * * * *